(12) United States Patent
Manu

(10) Patent No.: US 7,621,472 B2
(45) Date of Patent: Nov. 24, 2009

(54) PROCESS FOR PROCESSING ORGANIC WASTE

(75) Inventor: Alexander Manu, Toronto (CA)

(73) Assignee: Whirlpool Corporation, Benton Harbor, MI (US)

( * ) Notice: Subject to any disclaimer, the term of this patent is extended or adjusted under 35 U.S.C. 154(b) by 909 days.

(21) Appl. No.: 10/661,567

(22) Filed: Sep. 15, 2003

(65) Prior Publication Data

US 2004/0127355 A1 Jul. 1, 2004

Related U.S. Application Data

(60) Provisional application No. 60/410,327, filed on Sep. 13, 2002.

(51) Int. Cl.
B02C 19/00 (2006.01)
C05F 9/00 (2006.01)
C05F 9/02 (2006.01)

(52) U.S. Cl. .................. 241/3; 71/14; 241/74; 425/110

(58) Field of Classification Search ................. 502/401, 502/439; 68/1; 119/172; 241/3, 15, 29, 241/12, 17, 22, 23, 27, 16, 74; 264/109, 264/115, 124, 219, 232; 425/110; 71/11, 71/14

See application file for complete search history.

(56) References Cited

U.S. PATENT DOCUMENTS

| 3,819,456 A | 6/1974 | Enfield |
| 4,044,524 A | 8/1977 | Segale et al. |
| 4,102,263 A | 7/1978 | Forsberg |
| 4,265,408 A | 5/1981 | Voelskow |
| 4,275,651 A | 6/1981 | Groth et al. |
| 4,324,088 A | 4/1982 | Yamashita et al. |
| 4,620,479 A | 11/1986 | Diamond et al. |
| 4,638,730 A | 1/1987 | Bonacorsi |
| 4,900,160 A * | 2/1990 | Brooks et al. ............... 366/347 |
| 4,996,918 A | 3/1991 | Carter et al. |
| 4,997,102 A | 3/1991 | Bolling |
| 5,027,578 A | 7/1991 | Natterer et al. |
| 5,031,829 A | 7/1991 | Shantzis |
| 5,042,634 A | 8/1991 | Gulmini |
| 5,048,903 A | 9/1991 | Loblein |
| 5,119,722 A | 6/1992 | Carter et al. |
| 5,123,600 A | 6/1992 | Takenaka |
| 5,129,318 A | 7/1992 | Zimmer |

(Continued)

FOREIGN PATENT DOCUMENTS

DE 3245199 6/1984

(Continued)

OTHER PUBLICATIONS

English language abstract of DE19724197.

(Continued)

*Primary Examiner*—Wayne Langel
*Assistant Examiner*—Brittany M Martinez
(74) *Attorney, Agent, or Firm*—John W. Morrison; McGarry Bair P.C.

(57) ABSTRACT

A process for producing dried pieces of organic waste by reducing raw organic waste to pieces and drying the raw organic waste to a moisture content at which it is generally free of odors caused by microbial activity.

18 Claims, 10 Drawing Sheets

U.S. PATENT DOCUMENTS

| | | | |
|---|---|---|---|
| 5,172,630 A | 12/1992 | Thompson | |
| 5,174,042 A | 12/1992 | Tomizawa et al. | |
| 5,186,400 A | 2/1993 | Ignjatovic et al. | |
| 5,209,411 A | 5/1993 | Dineley et al. | |
| 5,240,187 A | 8/1993 | Wilson | |
| 5,259,304 A | 11/1993 | Roberts | |
| 5,292,637 A | 3/1994 | Bohnensieker | |
| 5,302,331 A | 4/1994 | Jenkins | |
| 5,355,789 A | 10/1994 | Suzuki et al. | |
| 5,377,921 A | 1/1995 | Wirth | |
| 5,425,456 A | 6/1995 | Erickson | |
| 5,447,017 A | 9/1995 | Becher et al. | |
| 5,447,685 A | 9/1995 | Sievert et al. | |
| 5,492,238 A | 2/1996 | Scholl et al. | |
| 5,522,913 A | 6/1996 | Peguy | |
| 5,551,170 A | 9/1996 | Sakatani et al. | |
| 5,599,138 A | 2/1997 | Kozak et al. | |
| 5,622,617 A | 4/1997 | Tsusaka et al. | |
| 5,634,600 A | 6/1997 | Kubota et al. | |
| 5,690,248 A | 11/1997 | Hulls | |
| 5,768,988 A | 6/1998 | Meloni | |
| 5,772,721 A * | 6/1998 | Kazemzadeh | 71/11 |
| 5,871,114 A | 2/1999 | Anderson et al. | |
| 5,925,321 A | 7/1999 | Koyamoto et al. | |
| 5,942,022 A | 8/1999 | Bislev et al. | |
| 5,957,295 A | 9/1999 | Neureither | |
| 5,976,435 A | 11/1999 | Djerf et al. | |
| 6,037,169 A | 3/2000 | Sako et al. | |
| 6,087,548 A | 7/2000 | Levy et al. | |
| 6,106,197 A | 8/2000 | Kozak et al. | |
| 6,114,648 A | 9/2000 | Takano et al. | |
| 6,131,371 A | 10/2000 | Esser et al. | |
| 6,141,945 A | 11/2000 | Becher | |
| 6,193,879 B1 | 2/2001 | Bowman | |
| 6,245,556 B1 | 6/2001 | Sako et al. | |
| 6,279,748 B1 | 8/2001 | Nakamura et al. | |
| 6,305,625 B1 | 10/2001 | Talamantez et al. | |
| 6,312,753 B1 * | 11/2001 | Kealey et al. | 426/631 |
| 6,390,396 B1 | 5/2002 | Takano et al. | |
| 6,458,299 B1 * | 10/2002 | Wierer et al. | 264/112 |
| 2002/0060428 A1 * | 5/2002 | Warren | 273/362 |
| 2004/0108277 A1 * | 6/2004 | Krulik | 210/723 |

FOREIGN PATENT DOCUMENTS

| | | |
|---|---|---|
| DE | 3607021 | 9/1987 |
| DE | 38 31 734 | 3/1990 |
| DE | 3831734 A1 | 3/1990 |
| DE | 197 24 197 | 12/1998 |
| DE | 19724197 A1 | 12/1998 |
| EP | 0 165 578 | 12/1985 |
| EP | 0165578 | 12/1985 |
| FR | 2 248 994 | 5/1975 |
| FR | 2248994 | 5/1975 |
| FR | 2 409 242 | 6/1979 |
| FR | 2409242 | 6/1979 |
| JP | 05-024601 | 2/1993 |
| JP | 05024601 | 2/1993 |
| WO | 8803053 | 5/1988 |
| WO | WO 88/03053 | 5/1988 |
| WO | 9116134 | 10/1991 |
| WO | WO 91/16134 | 10/1991 |

OTHER PUBLICATIONS

English lanugage abstract of DE3831734.
English language Abstract of JP 05-024601.
English Language Abstract of DE 3607021.
English Language Abstract of DE 3245199.
MS-N46 Product Description from http://prodb.matsushita.co.jp/product/info.do?pg=04&hb=MS-N46, p. 1.
English language machine translation of MS-N46 Product Description from http://prodb.matsushita.co.jp/product/info.do?pg=04&hb=MS-N46, p. 1.
English language machine translation of MS-N46 Product Description from http://national.jp/product/house_hold/garbage/garbage/ms_n46/ms_n46.html. p. 1-10.
English language machine translation of MS-N46 Product Description from http://national.jp/product/house_hold/garbage/garbage/ms_n46.html.p. 1-10.

* cited by examiner

PROCESS FOR PROCESSING ORGANIC WASTE

This is a non-provisional of U.S. provisional application No. 60/410,327 filed Sep. 13, 2002. The entirety of that document is incorporated herein by this reference to it.

FIELD OF THE INVENTION

This invention relates to devices and processes for processing organic waste, to compositions of matter or outcomes produced by such devices and processes, and to the use of such outcomes. The invention may be used, for example, to manage household or commercial organic waste.

BACKGROUND OF THE INVENTION

Managing organic waste (alternately called garbage, refuse, trash etc.) is an important issue for households, industries and municipalities. Various methods or devices are in common use today to divert organic waste from landfills, but fail to provide fully satisfactory solutions. The most prevalent diversion methods or devices include under-sink waste disposers, garbage compacters, home composting, and municipal collection and composting. These methods or devices will be described below.

Under-sink waste disposers are mounted below the basket of a conventional sink. Disposers are located in line between the sink basket and the sink drain line and provide means for chopping garbage into particles which can be washed down the drain line. A user inserts garbage through the sink basket, turns on the tap to provide a stream of water sufficient to wash down the garbage, and turns on the chopping means. Disposers are attractive to consumers because they provide an immediate and permanent means to remove garbage from the sink area. But while disposers are convenient for the user, they harm the environment. In particular, they use excessive amounts of water as required to entrain the garbage in a flow of liquid down the drain. And although the garbage is removed from the kitchen, it is merely transplanted to whatever sewage system services the house. The transplanted garbage is a burden on the sewage system and on the environment since all sewage treatment systems produce some form of discharge roughly in proportion to the amount of waste that they treat. Further, the potential value of the organic waste is lost. For these reasons, under-sink disposers have been banned in some jurisdictions. Under sink disposers are also not attractive to consumers that are environmentally conscious, consumers that pay for utilities based on the amount of water they use or sewage they produce, or consumers that use septic tanks or other private sewage treatment devices.

Garbage compacters basically crush all garbage put into them, and place the crushed garbage into a strong plastic bag. The volume of the garbage is reduced, but the total mass of garbage remains unchanged. The user gets some benefit from having a smaller volume of garbage to store or handle, but the weight and smell of the garbage remain and there are virtually no benefits to the municipality since the compacted garbage is mixed with general garbage that the municipality would crush at some point in any event. The potential value of the organic waste is again lost.

Because of the problems with trash disposers and compacters, environmentally conscious consumers and municipalities have promoted home composting. Home composting diverts some organic waste from landfills or waste treatment facilities and produces a potentially useful product from it. But consumers have only been partially receptive to home composting because it is essentially inconvenient. In home composting, homeowners maintain a composting bin or other receptacle in their own yard. The occupants of the household typically collect selected organic waste in a pail and empty the pail into the composting bin daily. Over time, the selected organic waste will turn into compost that can be used at the household, for example, as fertilizer for gardens. The garbage remains in the home until emptied to the compost bin, and must be taken to the compost bin periodically. Taking waste to the compost bin is often a nuisance since the compost bin is outdoors and, for aesthetic reasons, usually located as far from the house as possible. The compost bin also takes up space in the yard. For these reasons, a large portion of the population simply will not practice home composting and a large portion of those that do will only practice it sporadically. On a municipal level, the major problem with home composting is that it only works well if the user has a sizable yard. Businesses and people living in apartments and condominiums, or even townhouses with small yards, have no place for a composting bin and no use for the volume of compost they would create. Other problems relate to the slow speed of home composting and concerns for attracting pests. These problems generally prevent meat, dairy products and other organics from being home composted.

Municipal collection and composting has been proposed as a means to improve on home composting. In a typical application, a municipality provides its residents with a special container for organic waste. The homeowners collect organic waste in the special container over the course of a week, and then place the container at the curb for pick up. The municipality collects the organic waste and can process it at dedicated composting sites. A municipal composting site typically breaks down the waste faster than a home composting bin and may generate a steady supply of compost in sufficient volume to support a compost sales unit. A municipal site may also be able to extract usable biomass or gases for energy production. Of course these programs involve the cost of the special containers and the cost of picking up and transporting raw organic waste. The more significant problem, however, is that these programs remain inconvenient to the users. In particular, the special container is typically kept in a garage because it must be large enough to hold a week's worth of raw organic waste and because it smells by the time that the pick up day arrives. The user must either travel regularly to the garage to deposit organic waste or maintain interim collections of organic waste in the house. As with home composting, even users that support the environmental goals of a municipal composting program may only separate some of their organic waste for composting. Municipal composting programs are also similar to home composting in that they are generally not useful for people living in apartments or condominiums since the special container must be kept within the living area of each unit where it takes up space, looks ugly and smells.

Because of these and other problems, consumers and other users remain frustrated by the entire waste management and recycling process.

SUMMARY OF THE INVENTION

It is an object of the present invention or inventions to improve on the prior art. Another object of the invention is to reduce the extent to which odors and tasks such as moving, separating or storing organic waste cause people to be frustrated with organic waste management and recycling. The inventor has discovered that for users to be satisfied with, and fully participate in, an organic waste management and recycling process, most users need to have the sight, smell and bulk of raw organic waste immediately removed from their living or working space. Accordingly, another object of the inventions is to provide one or more devices or processes for converting raw organic waste into a less offensive state or outcome, and to provide further processes for handling or using the outcome. The following summary describes various features of the inventions to aid in understanding the exemplary embodiments described later, but does not define or limit the invention which may reside in a combination of some or all of the elements or steps described in this section or other parts of this document.

In some aspects, the invention relates to converting organic waste into one or more manufactures, materials or compositions of matter, which will be called outcomes. An outcome is created and exists at an intermediate point in time between when a person or machine deems the organic matter to be waste and when the matter is disposed of or input into a process for using it, for example for compost, fuel or some other purpose. The outcome is more convenient and less offensive for users to deal with than raw organic waste. In particular, the outcome may be one or more of less smelly, more compact, lighter, cleaner to handle, more visually attractive or easier to handle or store. For example, the outcome may be dried pieces of organic waste, each piece having no dimension longer than a few cm. Or the outcome may be a solid of substantially fixed shape, for example a brick, granule, pellet, sheet or disc etc., made of substantially dry pieces or organic matter. The pieces may be held together with a biodegradable or compostable binder or may be closely packed or compacted. Further optionally, the solids may be in a generally uniform or modular shape and size, may contain masking odors, or may be colored. The outcomes are sufficiently dry to prevent or at least substantially reduce microbial growth and its related odors. The outcomes remain substantially free of microbial growth for a useful period of time, for example between a few days and up to about one month, if kept out of contact with rain or soil but can be decomposed intentionally. Such outcomes may be enjoyable to handle, leave minimal residue on the hands, and be efficiently packed for removal to the curb or other destinations. The outcomes are more convenient to handle and less offensive than raw organic waste and so encourage users to divert organic waste from other garbage and to participate in composting or other programs. The outcomes can also be kept in the home or garage for extended periods of time, for example from a few days to about a month or more, without creating intolerable odors and so may allow the user to take garbage out less often than once a week at a savings of inconvenience to the user and cost to the municipality.

In other aspects, the invention relates to processes for producing the one or more outcomes. The processes for producing dried pieces of organic waste involve reducing raw organic waste to pieces and drying the organic waste. The organic waste may be dried before or after it is reduced and the reducing and drying may be performed by a variety of processes or combinations of processes. There may optionally be other steps such as washing; adding colors or odors; or wetting, for example to facilitate reducing the organic waste. The processes for producing solids involve, reducing raw organic waste to pieces; producing a mixture of the pieces, water and a biodegradable or compostable binder in proportions such that a solid may be formed from them; forming the mixture into a shape; and, drying the shaped mixture. The mixture may be heated to aid in drying it or to enhance or activate the binder. The binder may be added to the water and organic waste or may be a substance already present in the organic matter. Each step may be performed by a variety of processes. There may optionally be other steps such as washing, wetting, draining, venting, moving, sensing, weighing, measuring, storing, freezing, compacting or adding additives such as colors or odors. Some steps may also be repeated. For example, the mixture may be formed into a shape, partially dried or heated, formed into another shape, and then dried or heated further. Water, released as a liquid or vapor in some steps of the process, may be collected and recycled for use in other steps of the process. An alternate process involves compacting the pieces of organic waste into a generally stable solid shape. Pieces of wet or dried organic matter may optionally be produced at an interim stage in the process of producing solids.

In other aspects, the invention relates to one or more apparatuses capable of performing a waste processing process, such as one or more of the processes described above. In some cases, an apparatus has a processing module and a receiving module. The processing module may be stationary or temporarily stationary, may have one or more of electrical, water, drain and venting connections and some or all of the machinery necessary to perform one or more of the processes described above, and may be adapted to temporarily store raw or partially processed organic waste or outcomes. The receiving module may be portable, is adapted to receive organic waste, may have some of the machinery necessary to perform one or more of the processes described above, and may be adapted to temporarily store raw or partially processed organic waste. When the receiving module is connected to the processing module, the organic waste may be transferred to the processing module and one or both modules may be operated to perform a waste processing process such as one or more of the processes described above. The processing module may be freestanding, for example resting on a countertop or on a floor. Optionally, the processing module may be located below a sink and the receiving module and processing module may interface through a hole in the sink, for example a conventional drain opening. Further optionally, a conventional under sink garbage disposer may be used to provide an input to a processing module. The processing module may also be built into a cabinet unit or a unit containing other appliances. The receiving module and processing module may also be integrated into a single unit. Such apparatuses provide a means for users to quickly and easily convert objectionable raw organic waste into one or more of the outcomes.

In other aspects, the invention relates to one or more household organic waste appliances. For example, an appliance has a receiving area, which may be a portable receiving module, and a processing area, which may be a stationary or mobile processing module. The receiving area is adapted to receive and collect organic waste in a plenum. The receiving area may also have a reducing implement for reducing the organic matter and may optionally have an input for water to be added to the plenum. The receiving area has one or more outlets for discharging the contents of the plenum and the processing area is adapted to receive the organic matter discharged from the receiving area. An injecting and mixing device or devices may add binder to the organic matter in either area. The receiving area may have a separating device for removing free liquid water from the organic matter. Removed free liquid may be sent to a drain or saved for processing further organic matter. The receiving area has solid or porous surfaces to form and support the organic matter in a shape. The receiving area may have openings for water vapor to exit the processing area as the organic matter dries or means to retain the vapor, for example as a liquid which can be sent to a drain or re-used to process more organic matter. The processing area may also have heaters for heating the organic matter while it dries into a solid. The processing area also has an opening for the solid to exit the processing area.

In other aspects, the invention provides one or more processes or methods for handling or extracting value from the outcomes. In some cases, the outcomes are used privately, for example by placing them in a garden or compost pile. In other cases, the outcomes are collected for use in municipal composting programs. In other cases, a user may trade the outcomes to an organization in return for credits, money or other consideration. The qualities of the outcomes facilitate storing, collecting or transporting them.

BRIEF DESCRIPTION OF THE DRAWINGS

Various exemplary embodiments of the invention or inventions will be described below with reference to the following drawings.

DETAILED DESCRIPTION OF THE INVENTION

Outcomes and Methods for Producing Them

Figure 1:
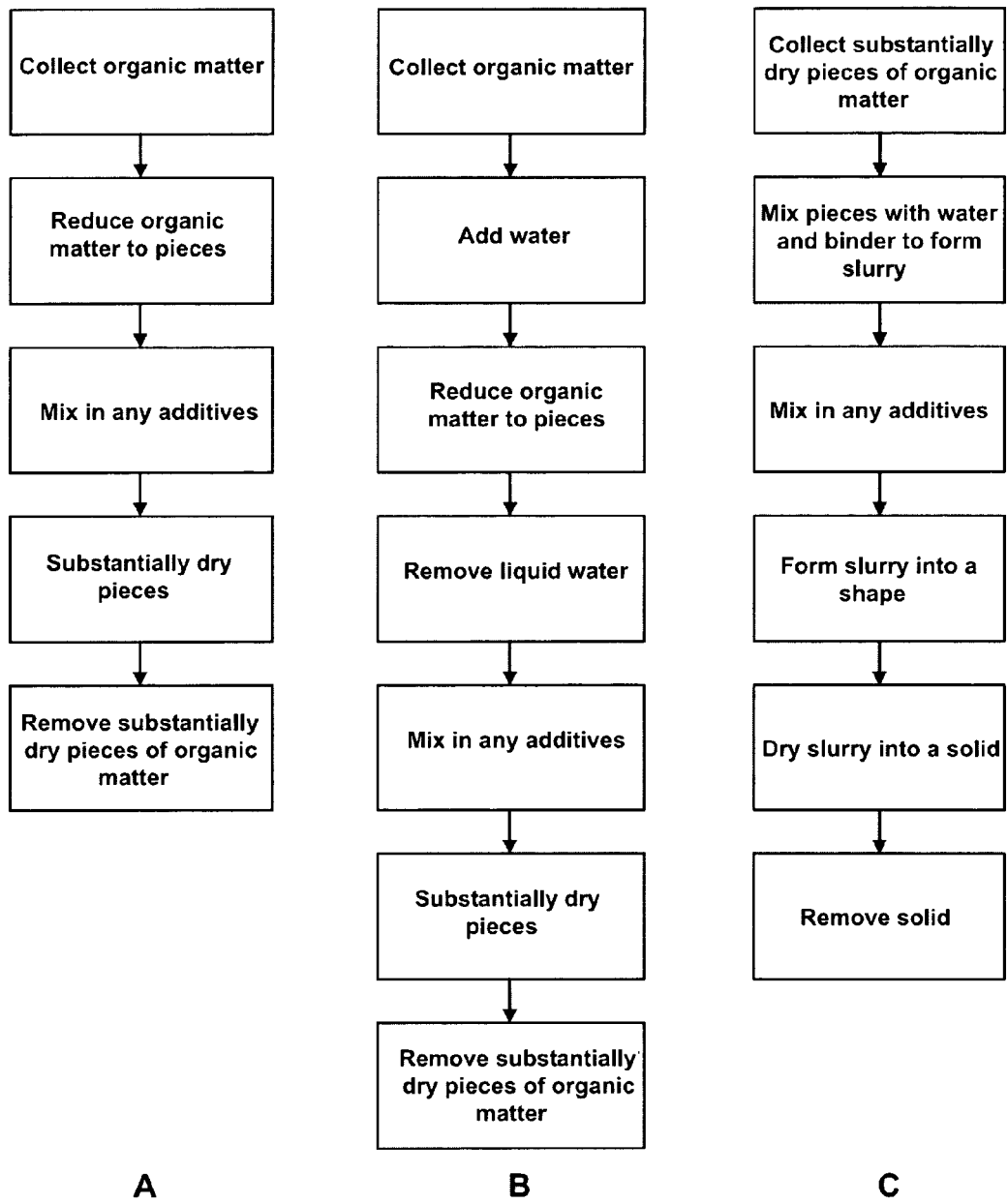
FIG. 1 is a flow chart of a first set of processes for making outcomes.

FIG. 1 illustrates a set of processes for converting organic matter into one or more outcomes. A first process is shown in column A. The process begins by collecting organic matter to be processed. The type of organic matter collected may vary according to the intended use of the outcome. For example, if the outcome will be used in private composting, the user may wish to collect only fruit, vegetable and cereal wastes typically composted at home. However, and particularly if the outcome will be used in municipal or commercial composting, the organic matter may include all food wastes as well as absorbing paper products such as paper towels, tissues or napkins.

The collected organic matter is reduced in size by separating it into pieces, for example pieces having no dimension greater than about 3 cm or no dimension greater than about 1 cm. The matter may be reduced by a variety of means including shredding, mashing, crushing, milling and chopping. Screeners, classifiers or separators may be used to allow matter below a desired size to exit the reducing process while retaining larger matter that requires further reduction.

The organic matter is also dried to the point where microbial activity substantially stops. The drying can be performed by a variety of means, typically involving one or more of pressing, evaporation or sublimation, as known in the art of process drying. For example, the organic matter may be dried using air bars, heaters, rotary dryers, air knives or internal impingement drums, suction dryers, drum dryers, rotary tubes or bed dryers. As shown in column A, the drying may occur after the organic matter is reduced in size. But the drying may also occur before the matter is reduced or at least partially while the organic matter is being reduced. The preferred order of steps may be chosen in view of the specific methods chosen to reduce and dry the organic matter.

Additives may be added to the organic matter to give the matter a more pleasant appearance or odor. For example, food coloring or dies may be added to make the organic matter green or some other desirable color. Highly aromatic, and preferably biodegradable, substances such as coffee grinds or vanilla extract may be added to give the matter a desirable smell. As shown in column A, the additives may be added after the organic matter is reduced but before it is dried. The additives may also be added before the organics are reduced or after they are both reduced and dried. The preferred time to add additives, if any, may be chosen in view of the qualities of the additive and whether it is easier to mix into dried or un-dried organics.

At the end of the process, substantially dry pieces of organic matter are produced as a first outcome. Because the outcome is in pieces it can be packed with a reasonably high density into a receptacle for storage or transport. Because the outcome is dry, microbial activity has substantially stopped and so the pieces are generally odorless. However, the outcome will re-absorb moisture from the atmosphere in time. The precise extent to which the matter is dried may be chosen depending on how long the user wants the outcome to remain generally odorless under the expected conditions of storage. For example, the user may intend to store the outcome for only a few days during a dry season before placing the outcome on a compost pile for decomposition. In contrast, another user may wish to store the outcome for a few weeks during a moist season before taking the outcome to a commercial composting plant. The first user will require significantly less drying than the second user to ensure that the outcome remains generally odorless until the outcome is intentionally decomposed.

Column B shows another process for creating an outcome of substantially dry pieces of organic matter. The process of column B is similar to the process of column A and much of the description above relating to column A applies to column B. The process of column B differs, however, in that water is added to the organic matter before it is reduced to pieces. The additional water enhances the performance of many reducing methods, such as chopping, and the amount of water added may be chosen in view of the requirements of the reducing method. After the organic matter is reduced, excess water is removed. The excess water may be removed using any of the drying methods mentioned above. However, since a larger quantity of free liquid water is to be removed, other processes such as spinning, centrifuging or pressing against a screened or porous plate may be more efficient. Through the course of adding and removing water, the organic matter is washed to some extent and may then be easier to dry to a generally odorless state.

The process of column B also differs from column A in that, although additives may still be added at any stage, any additive added before the liquid water is removed may be partially washed away. It is also not optional in the column B process to dry the organic matter before it will be reduced in size. Further, the first three steps in the process of column B (inserting organic matter, adding water and reducing the organic matter to pieces) may optionally be performed by an ordinary under sink garbage disposal unit. Such disposal units, however, use large amounts of water and may make the organic matter very fine and increase the amount of organic matter that washes away when liquid water is removed.

The process of column C can be used to convert the outcome created by the process of columns A or B into a different outcome. The different outcome is a solid of substantially fixed shape made up of pieces of organic matter dried to be generally odorless. The column C process is illustrated as a separate process, but it may also be merged with the process of either column A or B. In merging these processes, the steps of removing and collecting the dry pieces of organic matter at the end of columns A or B and the beginning of column C may be deleted. However, to produce a solid of a specified size and shape, the amount of organic matter used must be within a range determined by the tolerances of the size and shape specifications. But since users may randomly generate more or less organic matter over any particular period of time, the first step of columns A or B may be changed to collecting and storing organic matter until an appropriate amount of organic matter is collected. The organic matter can be stored in a sealed container, refrigerated or frozen to reduce odors while waiting for an appropriate amount of organic matter to be collected. Alternately, the appropriate amount of organic matter can be accumulated in the form of dry pieces of organic matter between the process steps of columns A or B and C. In this embodiment, the process steps of columns A or B are performed whenever the user wishes to process organic waste and with any amount of waste that the user wishes to process. The resulting dry pieces are stored until the required amount of organic matter, as determined by weight or volume or both, has been collected in the form of dry pieces. Since the dry pieces can be densely packed and are generally odorless, it may be easier to store and collect the required amount of organic matter as dry pieces than as raw waste. Further alternately, the process may be performed with any arbitrary amount of organic matter and allowing the size or shape of the outcome, or number of outcomes produced, to change accordingly.

Referring now to column C, the pieces of organic matter are mixed with water and a binder to form a slurry. The binder is capable of holding the pieces of dry organic matter together in a solid of generally fixed shape when stored in a protected environment, such as inside a garage or building. But the binder breaks down when exposed to the elements so that the solid may decompose or revert to loose pieces of organic matter. For example, the binder may be an organic substance such as egg whites, honey or a carbohydrate such as a starch or flour or sugar. The specific amounts of binder and water required may be selected in view of the binder used or other factors. For example, when flour is used as a binder for pieces of mixed organic kitchen waste, between about 2% and 15% flour by volume can be added. When using these ratios, the volume of the flour is measured when the flour is dry and the volume of the pieces of waste is measured with the pieces in a slightly wet state resulting from mixing the pieces with water and then draining away excess water through a sieve. The same ratios may also be used if the volume of the pieces of organic matter is measured dry. Adding an amount of flour near the high end of the range produces a more tightly bound solid and may be used for making thin sheet outcomes, when using large pieces of organic matter, or when the outcome will be required to remain durable for long periods of time, for example a month or more. Amounts of flour near the high end of the range may also cause the solid to dry faster. Amounts of flour near the low end of the range may be used for making brick outcomes, when using small pieces of organic matter or when the outcome will be composted a short time, for example about a week, after it is made. For some organic wastes, the waste itself may provide a sufficient quantity of binder such that no additional amount of binder is required. The amount of water added is such that the slurry can be formed manually into shapes and will generally hold a free-standing shape of a few cm high. Any additives may also be added during or after this stage if they have not been added earlier. Instead of collecting batches of substantially dry pieces of organic matter sufficient to make a solid of a desired size, all steps up to and including the step of forming a slurry in column C may be performed in batches until an amount of slurry is collected sufficient to make a desired solid.

Figure 2A:
FIGS. 2A and 2B are photographs of a solid outcome.
Figure 2B:
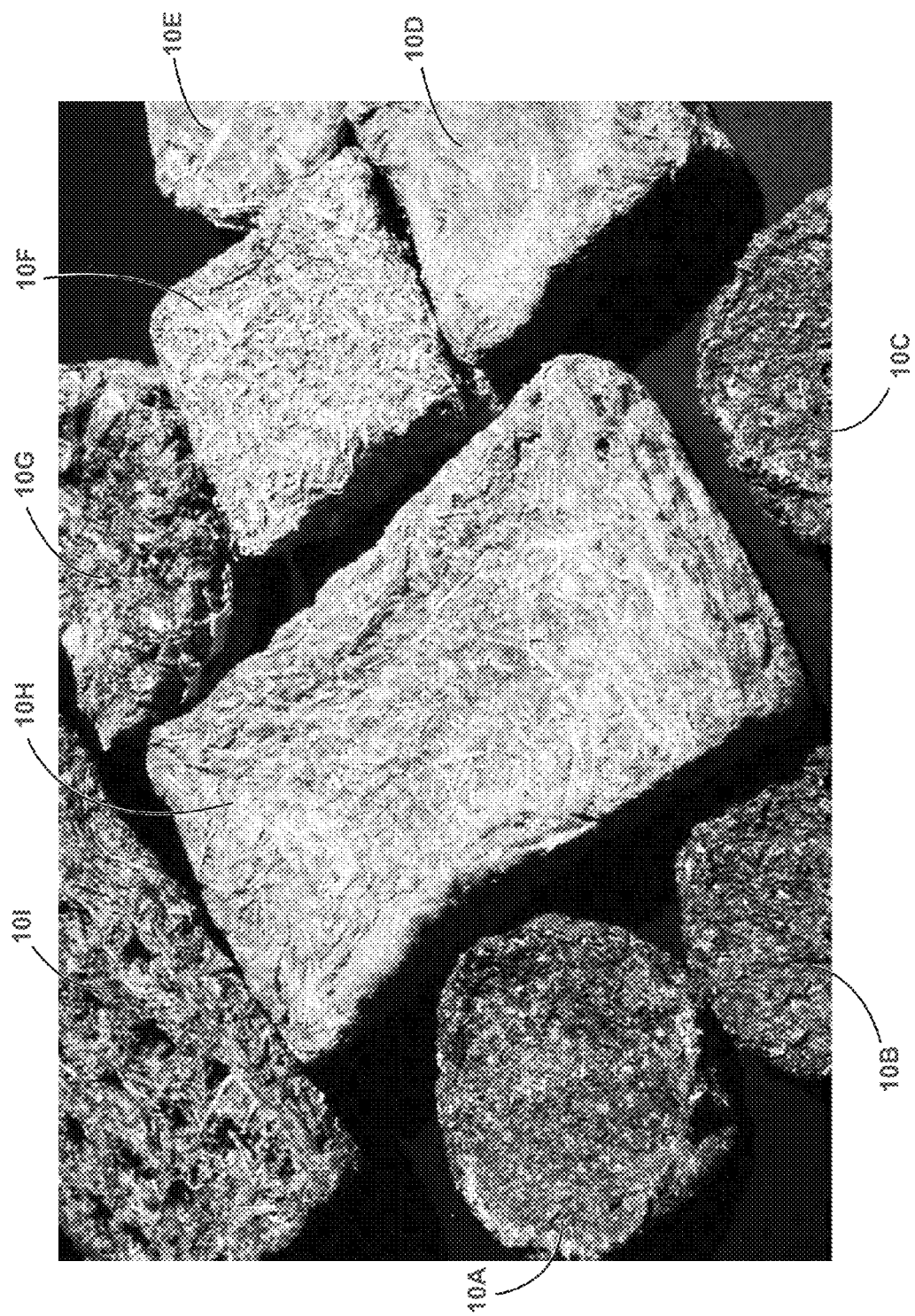
Figure 3:
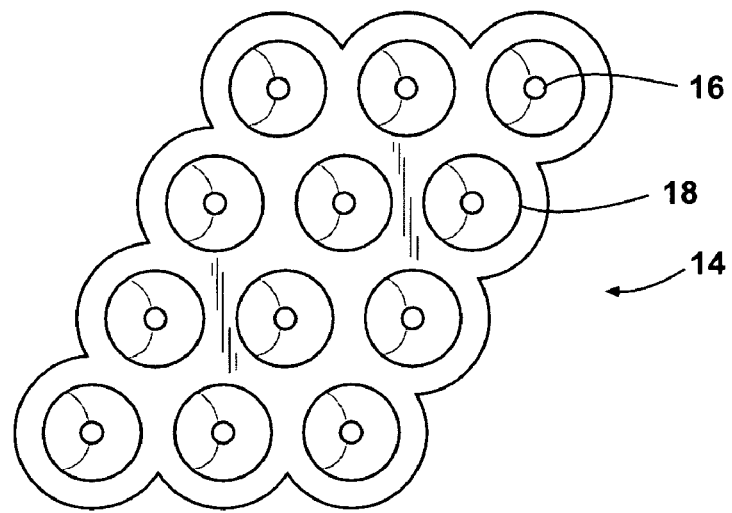
FIG. 3 shows top and bottom views of another solid outcome.
Figure 3:
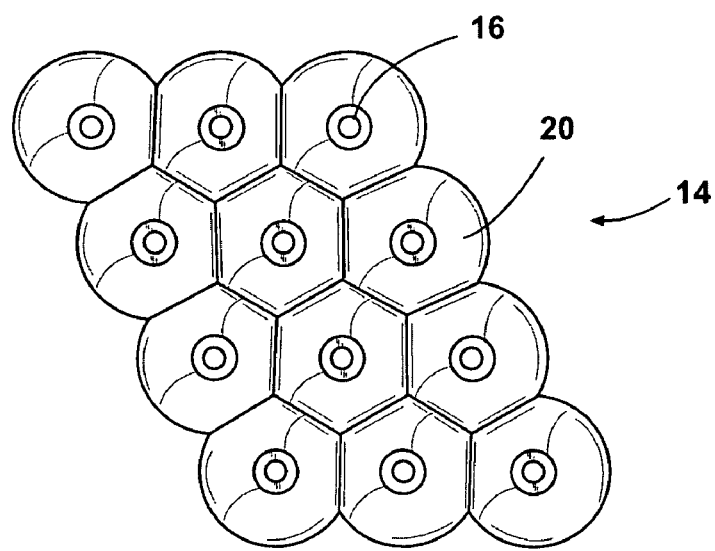

The slurry is formed into a shape and dried into a solid. The shape may be merely a mound or irregular sheet formed manually on a plate. However, a mold with at least a bottom and sides will produce a solid of more uniform shape and size. For example, FIG. 2A shows a brick 10 formed manually on a sheet. Such a brick 10 may also be formed in a mold and may be made with a height of between about 1 and 5 cm, a depth of between about 4 and 10 cm and a length of between about 10 and 25 cm. Such a brick 10 is a pleasant weight, size and shape to handle and may be densely packed into boxes or piles easily. However, such a brick 10 takes a significant amount of time to dry throughout and its sides 12 may become slightly dished during drying. FIG. 2B shows various bricks or solids of different shapes 10A-10I. The brick in the upper left hand corner of FIG. 2B designated as 10I, has holes through it from top to bottom that reduces the required drying time and distortion to the sides while drying. FIG. 3 shows a plate 14 that dries faster and more evenly than the brick 10. The plate 14 may be between about 3 mm and 2 cm thick, is pierced with holes 16 and has an undulating upper surface 18 and lower surface 20. The plate 14 is formed in a mesh-walled mold and the distance that water vapor needs to travel to leave the plate 14 is shorter and more nearly constant than for the brick 10. Outcomes may also be formed in a range of other shapes such as briquettes, flat sheets of between about 3 mm and 2 cm thick, granules, fibers or flakes. In addition to simple or mesh-sided molds, the desired shapes may be formed in other devices such as isostatic compacting presses, powder compacting equipment, or tableting or uniaxial presses. Compacters or presses may also be used to form the dry pieces of organic matter directly into a generally solid shape either with or without adding water or a binder to the pieces. Pressing the slurry into a porous mold also aids in drying the solid. If desired, the user could also use the slurry itself as an outcome, although it will be an outcome of short duration.

As for the dry pieces of organic matter, the solid outcomes are dried to a moisture content that makes them durable in anticipated environmental conditions when stored not in contact with liquid water or soil for a desired period of time that may be up to or over one month. While the slurry is dried into a solid, it may also be heated either to increase the rate of drying or to improve the activity of the binder. Heat can be provided by a number of methods that either heat the slurry directly or through the mold or by a combination of methods. The slurry may be heated to between about 35 C. to 100 C. or between about 35 C. and 50 C. If the organic matter includes bone, a higher temperature, for example 150 C. or more, may be used to help solidify the gelatin in bone waste. As examples, heat can be provided by steam, convection, thermal oil, combustion, fluid compression, electricity, microwave, contact/dielectric, conduction, radiant or infrared. The heat may also kill some additional microorganisms or cause changes in the chemical structure of the organic waste and extend the time for which the solid remains durable. Treating the organic matter with ozone or UV radiation may also kill some additional microorganisms and extend the time for which the solid remains durable.

The appropriate dryness of the solid, or the process parameters that produce the appropriate dryness, can be determined by trial and error for storage in various environments. Once the appropriate dryness has been determined for a desired solid size and shape and storage conditions, that dryness level can be obtained by repeating the process with the empirically determined parameters, by checking the dryness of the solid from time to time with a moisture content meter while it is drying, or by noting visual cues indicating a state of dryness. Visual cues may include dishing or cracking of some surfaces, changes in color or changes in the shape or size of the solid. Changes in size or weight of the solid may also be correlated with dryness and measured from time to time while a solid is drying to determine when the solid is sufficiently dry. The drying process may be machine controlled, for example by linking a moisture content meter or electronic scare to a programmable logic controller configured to stop the drying process when a target weight or moisture content is reached. A moisture content of 20% or less, or 15% or less, or between 5% and 15%, the percentage calculated based on the weight of water in the outcome divided by the weight of the outcome including the water in it, may be present in the dried outcome. For example, the moisture content of two sample outcome bricks were tested using an oven drying method similar to ASTM D644:M99 "Standard Test Method for Moisture Content of Paper and Paperboard by Oven Drying". The measured moisture contents were about 11% and 5% based on the original sample weight or about 12% and 6% based on the oven dried weight.

Figure 4:
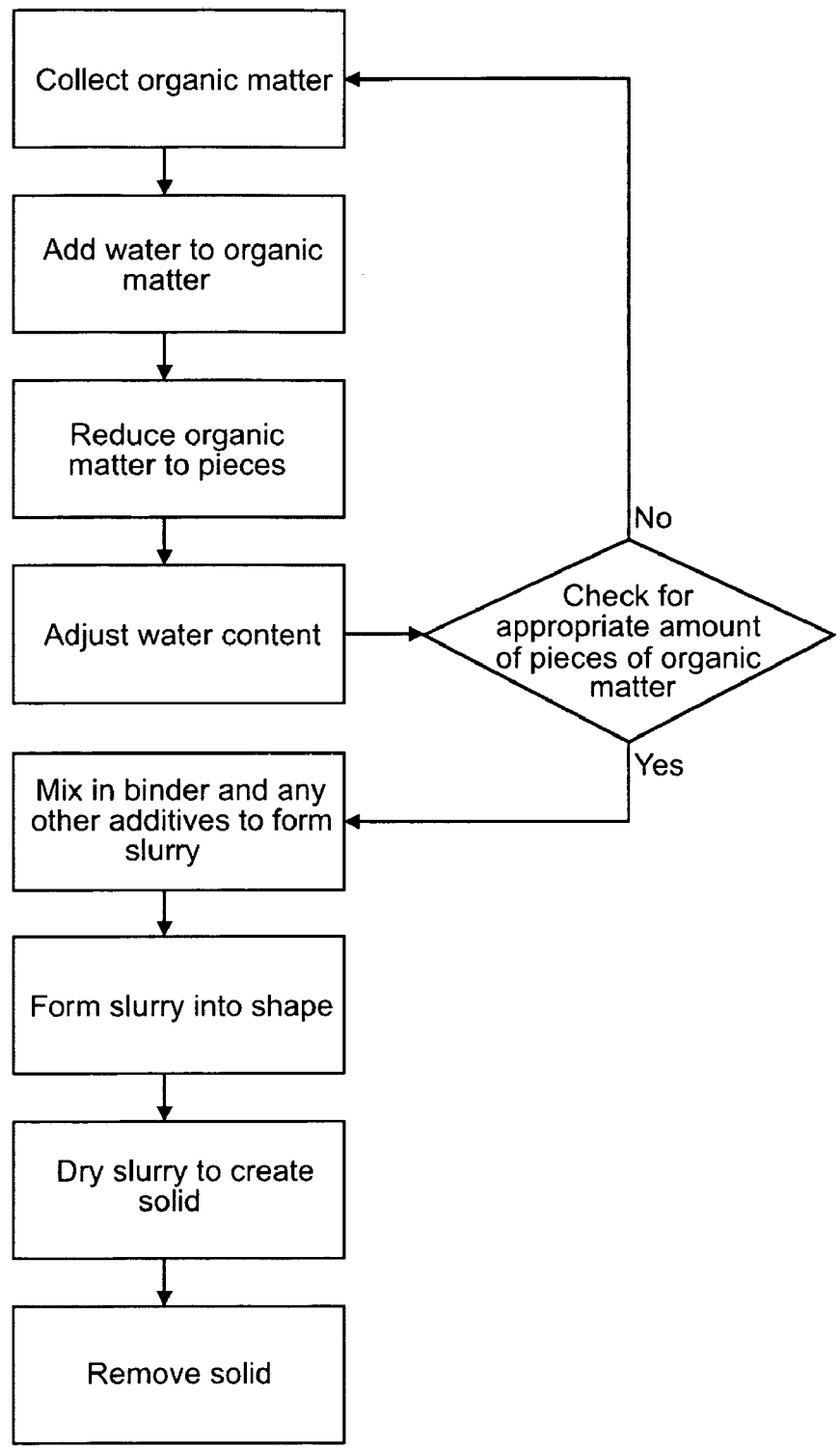
FIG. 4 is a flow chart of a second process for making outcomes.

FIG. 4 shows another process for producing solid outcomes. The process of FIG. 4 resembles a combination of the processes of columns B and C of FIG. 1 but differs in that an intermediate outcome of substantially dry pieces of organic matter is not produced. Accordingly, some process steps of Columns B and C of FIG. 1 are not required.

The process of FIG. 4 begins by collecting organic matter to be processed. Water may be added to the organic matter if necessary or desired. As mentioned above, some reducing processes operate better in the presence of water but the organic matter itself may contain a significant amount of water that will be released as soon as the organic matter is reduced. Accordingly, in some cases the organic matter supplies water for the process.

The organic matter is reduced to pieces and the water content of the organic matter may then be adjusted. For example, if an excess of water was present to facilitate reducing the organic matter, then water is typically removed after the organic matter is reduced. The water content may be adjusted to a level that is sufficient, or slightly more than sufficient, for the intended binder. The water content may also be adjusted to a pre-selected state of wetness to facilitate the remaining process steps. Such a pre-selected state may also be achieved by adding an appropriate amount of water before the organic matter is reduced.

After the organic matter has been reduced, it is checked to see if there is an appropriate amount of organic matter for making a desired size, shape and number of outcomes. For example, the weight, volume or both of the organic matter may be measured and compared to a pre-determined weight, volume or both known to produce a desired number of solids of a desired size and shape. This step is typically easier to perform at a pre-selected state of wetness since variation in wetness does not need to be considered. But this step may also be performed with a random degree of wetness, for example by allowing the pieces to settle or pressing the pieces to the bottom of a container and measuring their volume. If an appropriate amount of organic matter is present, then the process continues. If not, then more organic matter is collected and partially processed until an appropriate amount of organic matter is collected. As discussed above, the user may also determine how much raw organic waste is required to form the desired outcome and commence the process only with the required amount of organic waste. In this case, it will not be necessary to check for an appropriate amount of pieces later in the process but it may be necessary to store raw waste temporality until an appropriate amount is accumulated. The stored organic matter may be frozen or otherwise prevented from producing odors while waiting for an appropriate amount of organic matter to be collected. Alternately, the process may also be run with any arbitrary amount of organic matter. In this case, however, the number, size or shape of the outcomes may vary. For example, if a brick 10 will be formed in an open pan, the height of the brick will vary in relation to the amount of organic matter used. If a plate 14 will be formed between upper and lower forms, then the width or length of the plate 14 may vary with the amount of organic matter used.

A binder and, optionally, any other additives may be mixed with the organic matter. However, in some cases the organic matter itself may contain significant amounts of binders and so no additional binder is added. Although FIG. 4 shows the binder being mixed in after the water content is adjusted, the binder may optionally be mixed in before the water content is adjusted. If the water content is adjusted by removing liquid water, then some of the binder will be washed away, but it may be easier to mix in the binder while the water content is higher. As for the other processes, additives such as food coloring or dies or pleasant aromas can be added at various points in the process and need not be added where indicated in FIG. 4. Once the slurry has been created, the remaining process steps are the same as described for Column C of FIG. 4.

In the absence of any special equipment, the processes above may be performed using common kitchen appliances. For example, to perform the process of FIG. 1, Column A, the user may place organic waste into a blender. The user turns the blender on until the user may see that the organic matter has been chopped into small pieces. The user may drop any additives into the blender while the organic matter is being chopped. The user then pours the pieces out of the blender onto a cooking sheet and heats them in an oven until they are dry. When the pieces are dry, the user takes the cooking sheet out of the oven and dumps the dry pieces into a bag, bucket or other container. The process of FIG. 1, Column B may be performed in essentially the same way except that the user pours water into the blender with the organic waste. After the organic matter is chopped up, the user may remove the liquid water by allowing the pieces of organic matter to settle and then pouring excess water out of the top of the blender. Alternately, the user may pour the contents of the blender into a sieve and keep only the retained pieces of organic matter. To perform the process of FIG. 1, Column C, the user may collect the dry pieces of organic matter in a mixing bowl. The user then pours in water, a binder and any desired additives, places the beaters of a mixer into the bowl and turns the mixer on until a slurry forms. The user may then pour the slurry into a bread or cake pan and put it in an oven for drying. Once dry, the user takes the pan out of the oven and turns it over so that the solid drops out. For the process of FIG. 4, the user may place water and organic matter in a blender and turn the blender on to reduce the organic matter to pieces. If necessary, supernatant water may again be poured off the top of the blender or the contents of the blender strained to remove liquid water. The user then pours the pieces of organic matter into a mixing bowl. If the pieces are too dry at this point for mixing with the binder, then the user adds water as necessary. The user then completes the process as described for the end of the process of FIG. 1, Column C. In all of these processes, if the user wishes to collect a certain amount of raw organic matter before processing it, the user may keep odors low while accumulating the waste organic matter by collecting it in a sealed container or in a container kept cool in a refrigerator or frozen in a freezer.

As an example, the inventor collected household kitchen waste and reduced it in a blender with an excess of water until the pieces of organic waste were not more than about 3 mm in any dimension. The inventor then emptied the waste into a sieve to remove excess water. The inventor then collected more household waste and similarly blended it with water and poured it in the sieve. When the sieve contained about 650 cubic cm of pieces, the pieces were mixed with a full tablespoon of flour for a binder, and formed into a brick shape of about 4 cm by 8 cm by 20 cm. The pan was heated in an oven at 50 C. for about 32 hours. The resulting brick remained dry to the touch and substantially odorless for at least about three weeks. In another example, the inventor similarly produced pieces of organic matter but having no dimension more than about 2 cm. The pieces were poured from the sieve into cheesecloth and pressed by hand to remove more water. The pieces were then mixed with flour and spread out in a sheet about 1 cm thick in a pan. The inventor poked holes of about 7 mm in diameter through the sheet. The sheet was heated in an oven for about 5 hours at about 50 C. The resulting sheet remained dry to the touch and substantially odorless for at least about two weeks.

For further example, discarded organic matter, such as kitchen waste, may be chopped by machine or by hand into chunks of about 5 cm or less in their longest dimension. The organic matter may be, for example, vegetable scraps, vegetable and bread scraps, vegetable and bread scraps and absorbent papers, cooked leftovers or vegetable scraps and cooked leftovers. The chunks are placed in a mixing bowl and their volume measured without compacting them. About 125 mL of water per liter of chunks and about 125 mL of flour per liter of chunks is added to the bowl. Colouring or odourous substances may also be added. Further, about one teaspoon of sugar per liter of chunks may be added to the bowl. The sugar makes a finished solid more brittle, which tends to reduce the time required to compost it, and also reduces the required drying time. The contents of the bowl are blended for about 30 seconds or until the contents become a rough paste. Additional water may be added if a paste will not form. Alternately, adding about 250 mL of water per liter of chunks to the bowl initially, instead of 125 ml of water per liter of chunks as stated above, generally avoids the need to add additional water later to create a paste. However, additional water or an increased initial amount of water is often not needed, particularly when the organic waste includes cooked leftovers or other waste having a high water content.

The paste is transferred to a sieve or cheesecloth and pressed by hand to release water. The water-reduced paste is then transferred to a flat cooking sheet and formed, for example by hand or with a spatula, into a block or other shape. The cooking sheet and shape are placed in an oven heated to between 200 and 300 F. for about 30 minutes. After this time, the shape is retrieved from the oven and pressed further into a smaller or more geometric shape. The solid may be re-shaped since the flour or other parts of the mixture will have started to bind or coagulate making a shape easier to form. Also, air pockets may have formed that may be released allowing a smaller shape. Holes, for example holes of about 0.5 cm diameter spaced roughly 1 to 2 cm apart, may be poked through the shape with a dowel at this stage to speed future drying. The shape is returned to the oven. The oven is turned off, but the door left closed allowing the shape to dry as the oven loses heat to the environment.

Drying may also be accomplished without heating. For example, the slurry may be placed in a mold and left to air dry. Drying will be faster if the mold is porous, for example if at least some sides are made of screen or cloth. The porous mold provides more surface area for moisture to leave the solid as well as allowing some liquid water to drip out. Drying the paste outdoors, but out of contact with rain, in a porous mold produces a sufficiently dry solid particularly in dry or sunny weather without using energy for heating.

In all of the processes described above, water released in some steps may be recycled for use in other steps. For example, water is released as a liquid or vapor during drying steps and as a liquid during steps of removing liquid water or adjusting the moisture content of pieces of organic matter. This water may be collected and used, for example, in steps of adding water, or mixing pieces of organic waste with water. In general, the steps that require water precede the steps in which water is released. Accordingly, an initial supply of water is required to perform a first batch, if a process is performed wholly or partially as a batch process, or to start a continuous process and run a continuous process before recycled water is available. Although an initial supply of water may be required, the processes produce water overall since the moisture content of the organic matter is reduced. For this reason, not all releases of water need to be captured to sustain a repeated batch or continuous process. For example, vapors produced during drying steps may be captured since they provide relatively clean water that may be stored without further treatment until required without excessive growth of microorganisms in the water. Alternately, recycling water released in steps of removing liquid water or adjusting the water content of the pieces of organic matter reduces the amount of dissolved or very small pieces or organic matter that are not captured by the process. However, this water may require treatment, such as UV or chemical disinfection or refrigeration, if it will be stored for extended periods of time before reuse and may require adjustment, for example by filtration, clarification or other separation processes, to prevent it from becoming highly concentrated with organic matter. Organic matter separated from the recycled water may itself be recycled to and re-enter the process as collected organic matter.

Although the processes described above result in a dried outcome, the processes may optionally be stopped at other phases. For example, the process may stop when a slurry is present. The slurry may be useful when a user wants an outcome for immediate use that decomposes very rapidly, since the slurry will decompose faster than raw organic matter.

Apparatus for Producing Outcomes

Figure 5:
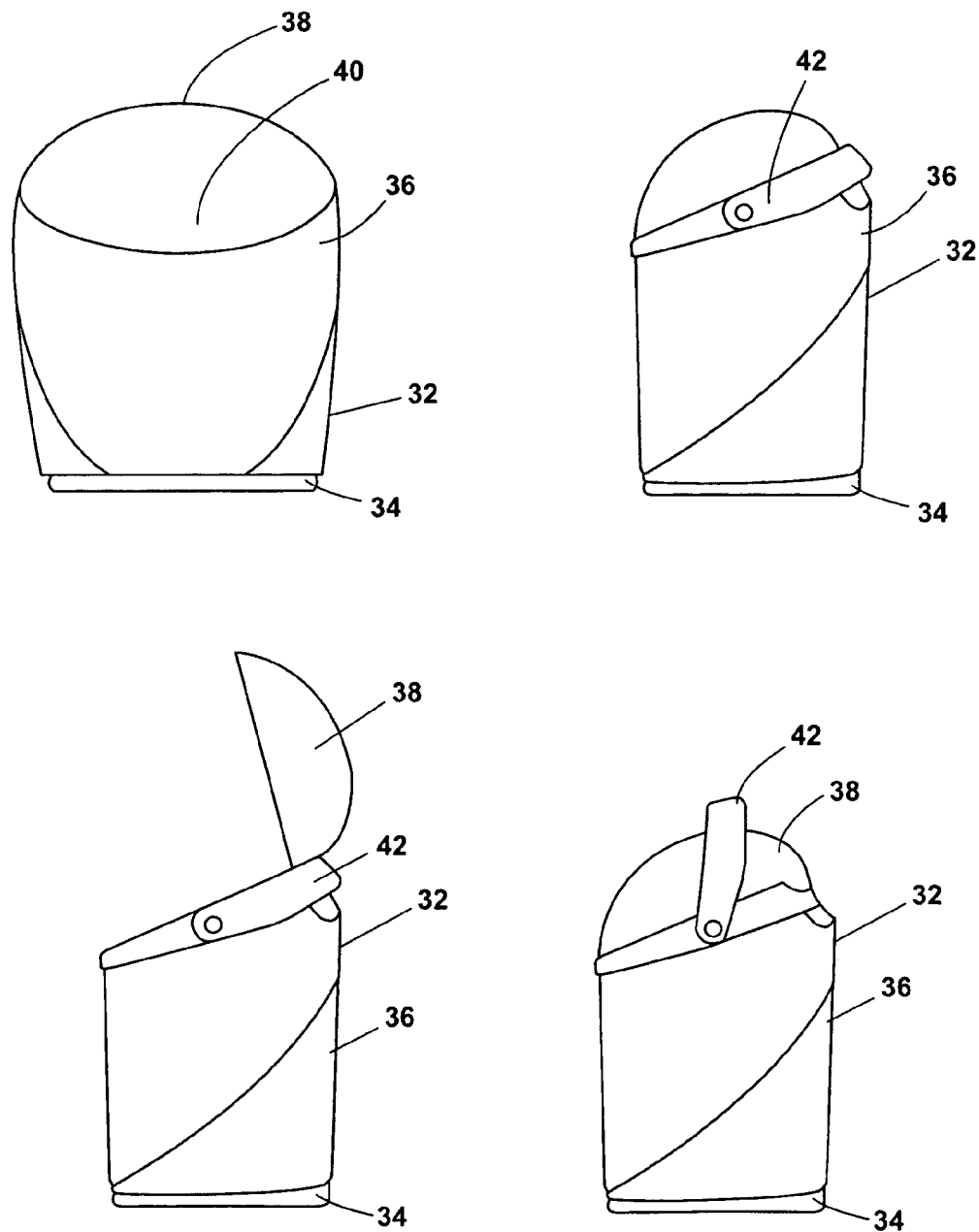
FIG. 5 shows various views of a receiving module of an apparatus for practicing the process of FIG. 4.

FIGS. 5 to 8 show an apparatus 30 for producing solid outcomes. Referring first to FIG. 5, the apparatus 30 has a receiving module 32 for collecting organic waste. The receiving module 32 has a base 34 and sides 36 that create an internal space for collecting and holding waste. A lid 38 is hinged to one of the sides 36 and may be closed to generally seal the space inside the receiving module 32 or opened to allow the user to insert waste. The lid 38 may seal the space inside of the receiving module 32 to a sufficient degree so that odors are not sensed by users from organic matter that may remain in the receiving module 32 for most of a day. The lid 38 is balanced to remain open when fully opened and has a finger depression 40 to allow the user to lift it. A handle 42 flips up or down for carrying. When the handle 42 is down it does not protrude beyond the sides 36 of the receiving module 32. An apparatus 30 may have a plurality of receiving modules 32. The receiving modules 32 may be dispersed throughout a household or business, and kept at collection points in a kitchen, dining room, bathroom or wherever organic waste is produced. The receiving module 32 may have an exterior made of stainless steel or other attractive and safe materials. Many other shapes may also be used for the receiving module 32. For example, in some embodiments, the handle 42 may protrude from beyond the sides 36. Two handles 42 may be used on opposed sides 36 to make the receiving module 32 ambidextrous. The receiving module 32 may be made to have a removable lid 38 and height, for example of 25 cm or less, such that it may be periodically washed in the bottom drawer of a dishwasher.

Figure 6:
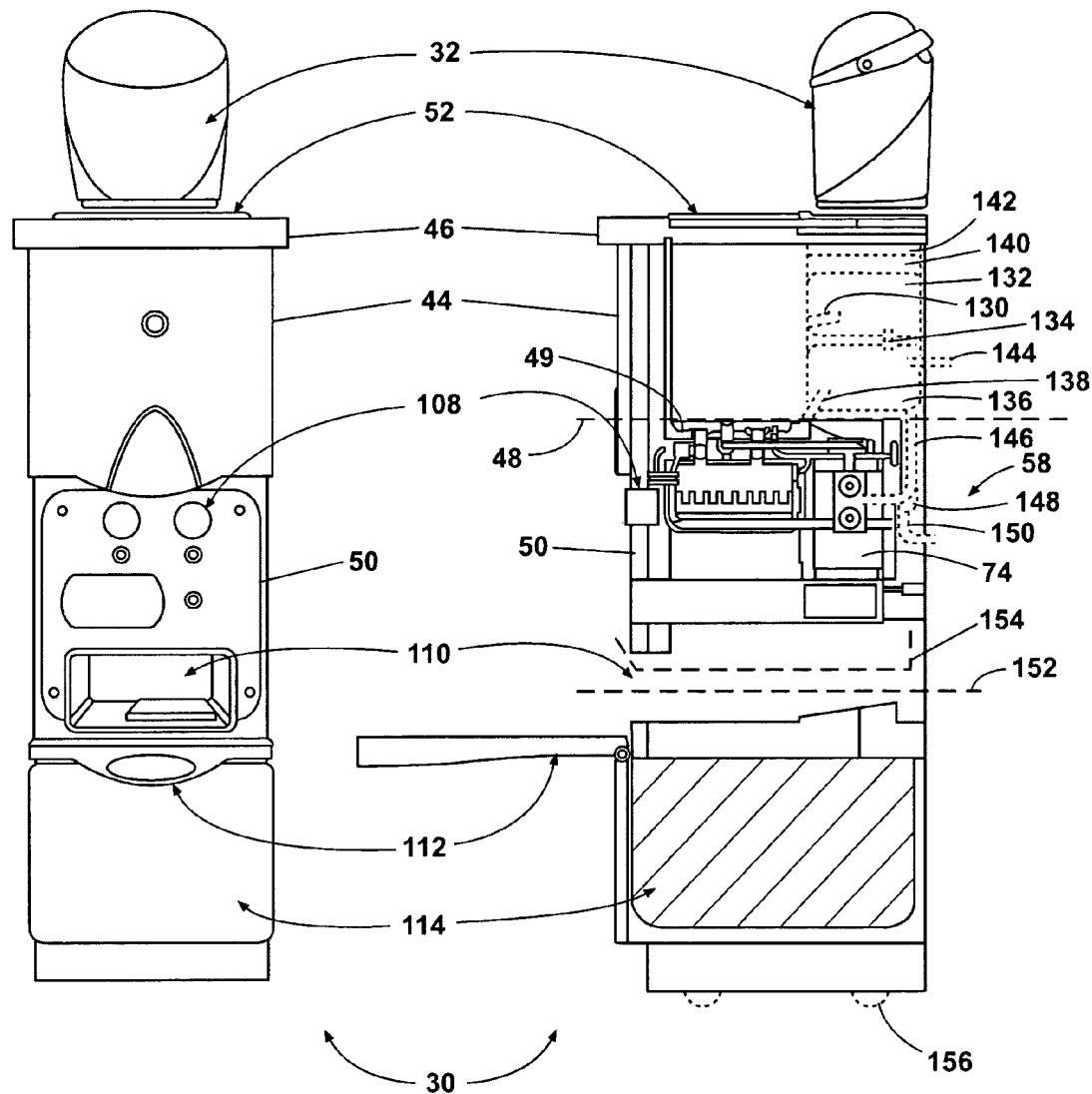
FIG. 6 is a schematic representation of the receiving module of FIG. 5 and schematic front and cut away views of a processing module of an apparatus for practicing the process of FIG. 4.

Referring to FIG. 6, the apparatus 30 also has a processing module 44 and a system controller 50. The system controller 50 manages the operation of the processing module 44. The system controller 50 is mounted in a location accessible to the user and contains controls for operating or programming the apparatus 30 and an interface that gives the user feedback and prompts the user to make any required choices or actions. For example, the system controller 50 gives the user operational and standby status information and notice of any need for fresh supplies such as binder. In other embodiments, household particulars may be entered into the system controller such as the time or user's address. The system controller 50 may also be programmed to keep track of the local garbage pickup schedules and remind the user when garbage needs to be put out. The system controller may also allow the user to specify preferences or over-ride pre-programmed routines to change the operation of the processing module 44. For example, in some embodiments the user may specify the desired size, shape or form or output, the amount of binder to use, whether to use any additives such as colors or odors, the moisture content for the output, or whether the output should be wrapped, bagged, or bar-coded to contain household information.

The processing module 44 may be a freestanding unit as shown. If desired, however, the processing module 44 may alternately be installed under a kitchen counter. When the processing module 44 is installed under a counter, the top 46 of the processing module 44 may sit in a hole in the counter either flush with the counter top or slightly above or below it. Further alternately, the processing module 44 may be installed under a sink with some alteration. In particular, portions of the processing module 44 above the sink bottom 49 shown in FIG. 6 are discarded or relocated to locations below the sink bottom 49. A hole is provided in the sink bottom 49 so that receiving module 32 may still communicate as necessary with the processing module 44. A plug, not shown, seals the hole when the apparatus is not in use. Alternately or additionally, parts of the processing module 44 that are accessible to the hole are made waterproof and configured so that water will not run out of the sink through the processing module 44. When the processing module 44 is mounted under a counter or sink, at least the user interface parts of the system controller 50 may be separated from the remainder of the processing module 44 and mounted in a location convenient to the user.

Figure 7:
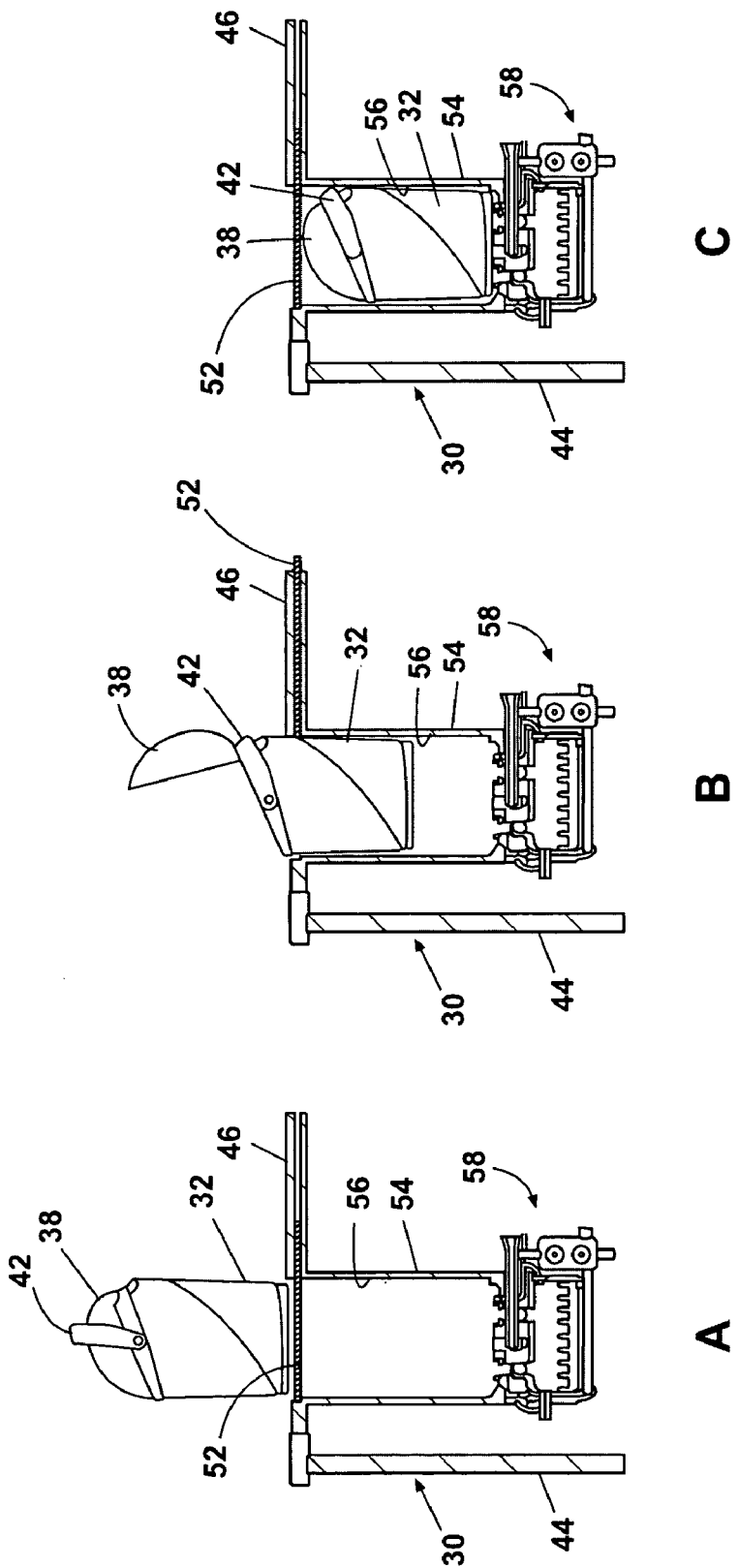
FIG. 7 is a schematic representation of aspects of the interaction between the receiving module and processing module of FIG. 6.
Figure 8:
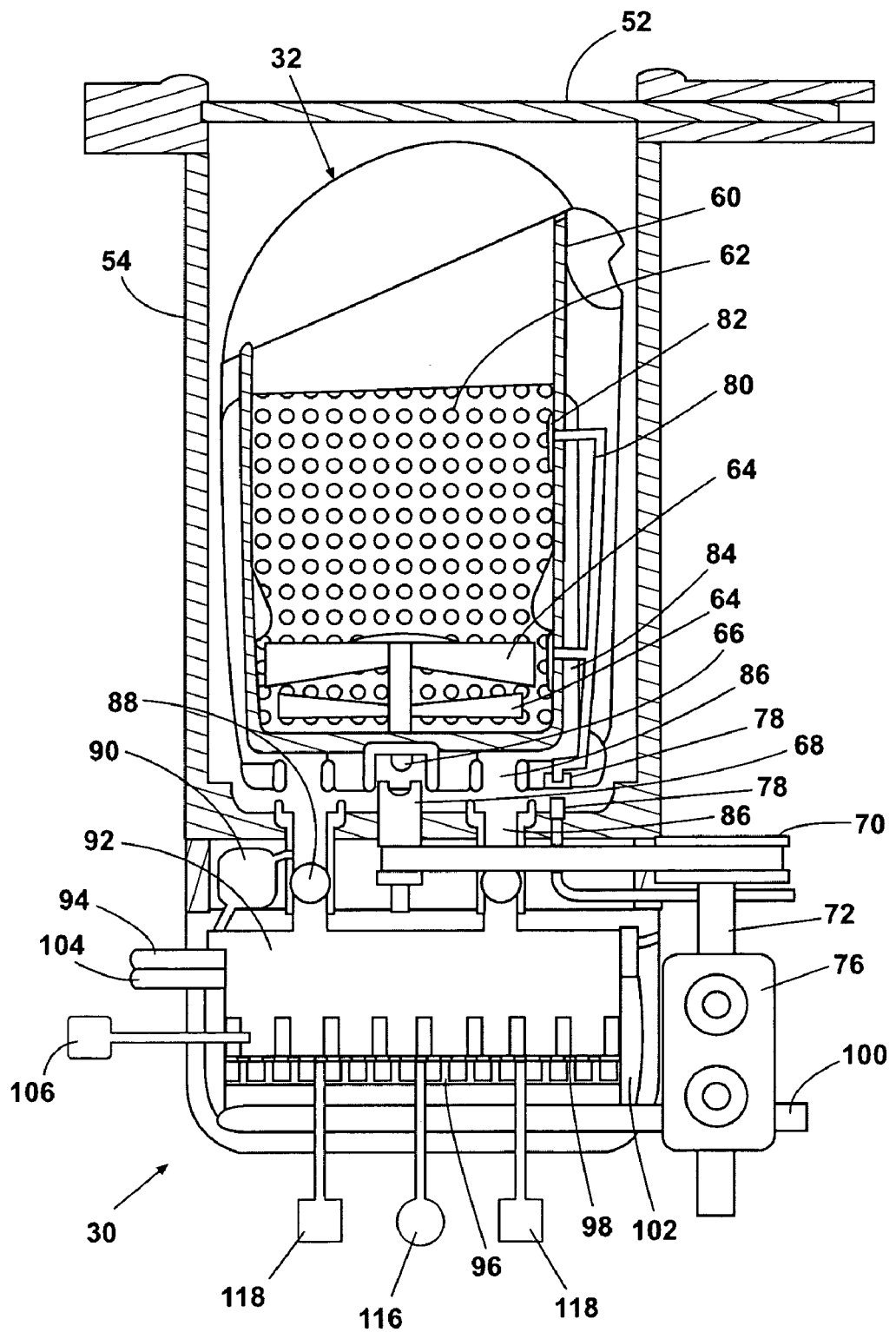
FIG. 8 is a schematic cross-section of the receiving module and part of the processing module of FIG. 6.

FIG. 7 shows aspects of how the receiving module 32 interacts with the processing module 44. In part A, the receiving module 32 is placed on a gate 52 of the processing module 44. The user may then push a button on the system controller 50 that causes a motor, solenoid, or hydraulic or pneumatic cylinder or other mechanism, not shown, to open the gate 52. Alternately, the processing module 44 may be configured such that the gate 52 opens when user passes his or her hand in front of a motion detector (infrared sensor) on the processing module 44. Alternately, the processing module 44 may be configured such that the gate 52 opens when a sensor on the processing module 44 detects the presence of the receiving module 32.

As shown in FIG. 7, Part B, with the gate 52 open, the receiving module 32 slides into a track 54 in the processing module 44. A scrubber 56 in the track 54 applies sufficient force to hold the receiving module 32 part of the way down the track 54 if desired. The receiving module 32 may be left in this position, optionally with the lid 38 left open, while waste is being generated. In this position, the receiving module 32 provides a convenient counter top, or counter top height, place to deposit waste as it is produced. Optionally, the receiving module 32 may be insulated and fitted with a small refrigeration unit that is turned on only when the lid is closed. The refrigeration unit may be powered by batteries which are recharged automatically when the receiving module 32 is in the track 54. Alternately, the refrigeration unit may be powered directly from the processing module 44 when the receiving module 32 is in the track 54. The refrigeration unit prevents significant odors from developing if waste is left in the receiving module 32 for extended periods of time.

When the user wishes to process the waste, the user closes the lid 38 if it is open and pushes the receiving module 32 to the end of the track 54 where it engages with the processing mechanisms 58 of the processing module 44. Pressure contacts, not shown, or other sensors sense when the receiving module 32 is fully engaged and signal the gate 52 to close. The pressure contacts also send a signal indicating that the receiving module 32 is engaged to the processing module 44. Alternately, the user may be required to move a lever, rotate a knob, flick a switch that triggers a solenoid or perform some other action to engage the receiving module by physically connecting it to the processing module 44. In this case, the signal indicating that the receiving module 32 is not sent until a sensor confirms that the physical connection has been made. The processing module 44 is configured to only permit process steps involving the receiving module 32 to occur while the receiving module 32 is engaged. However, where the user performs a function to physically connect the modules 32, 44, that function may also be used to power a function. For example, a lever pulled by the user to connect the modules 32, 44 may also activate the release of an amount of binder into the receiving module 32. To do this, the binder may be located in a tube that is compressed by a plunger mechanically linked to the lever. Adding the binder to the receiving module 32 may increase the amount of binder that is washed away when the solid is dewatered, but may also allow for better mixing of the binder with the organic matter.

After the waste is transferred to the processing module 44, the receiving module 32 will be empty and the system controller will cause the gate 52 to open. The user then reaches into the processing unit 44, lifts the handle of the receiving module 32 and lifts it out. The user then pushes a button on the system controller 50 to instruct it to close the gate 52. Optionally, the processing module 44 may be fitted with sensors that signal the system controller 50 to close the gate 52 when the receiving module 32 has been fully removed. As discussed below, the inside of the receiving module 32 will have been rinsed with water at the end of the processing steps, optionally with heated water or water containing a disinfectant. If desired, however, the user may also spray the inside of the receiving module 32 with a cleaner, anti-microbial agent or scent-neutralizer after removing it from the processing module 44.

The apparatus 30 may also have the components of the receiving module 32, processing module 44 and system controller 50 merged into a single appliance body. In this case, some elements required to connect the receiving module 32 to the processing module 44, as described above, are not required. For example, components of the receiving module 32 may be permanently located in the position shown in Part C of FIG. 7. The gate 52 and track 54 and other components may be removed and the lid 38 of the receiving module 32 made to open directly to the outside of the apparatus. In that configuration, a user brings all waste to be processed to the apparatus 30 for insertion through the lid 38. However, an alternate means of causing the processing module 44 to start is required since the action of engaging the receiving module 32 no longer performs that function. For example, the lid 38 may be provided with a sensor that signals for processing to start every time that the lid 38 is closed. Alternately, the controller 50 may be provided with a start button and the user required to indicate when processing should start by activating the button, a lever or similar device. Alternately, the receiving module 32 may be fitted with weight or level sensors and the controller 50 adapted to start processing when a threshold weight or height of organic matter is present in the receiving module 32. These methods may also be combined or other methods used. For example, processing may begin when a threshold weight of organic matter is reached unless the user bushes a button or switch to start processing before the threshold is reached. Such an integrated apparatus 30 may also be placed in its entirety under a sink. In such a case, the lid 38 may protrude through the sink so that water does not drain out of the sink through the apparatus 30 when not intended and the normal sink drain retained. In addition, the presence of the lid 38 may encourage users not to put soap or cleaning chemicals that may be used in a sink into the apparatus while still making it possible to add water to the receiving module 32 by simply turning on the tap to the sink while the lid 38 is open. However, the apparatus 30 may also be used without a lid 38, or with a lid 38 or other closure that may be attached or closed only while processing waste, and receive matter directly from the ordinary sink drain. In this case, since there will be times when very large amounts of water are discharged from the sink which would otherwise require very frequent processing, the receiving module 32 may be provided with a large screened outlet to drain partway up its side. In that way, some water, as is useful for processing, may remain in the receiving module, while excess water flows through. The outlet is closed while processing. Optionally, a diverter may be inserted between the sink and the apparatus 30. The diverter allows solid matter to drop to the apparatus 30 while passing excess water to a drain.

FIG. 6 shows the processing mechanisms 58 of the processing module 44 and working parts of the receiving module 32 in greater detail. Also referring to FIG. 8, the receiving module 32 has a frame 60 that may be made, for example, of stainless steel and supports the other parts of the receiving module 32. A perforated liner 62 lines the inner space where raw waste is held. The holes in the perforated liner 62 are sized so that only organic matter that has been reduced to a desired size will pass through them. Blades 64 are mounted inside of the perforated liner 62 for reducing the organic waste to size. In some embodiments, the blades 64 are covered by blade covers (not shown) which are withdrawn when the receiving module 32 is engaged to protect against the user touching the blades 64 while inserting waste. Two sets of blades 64 are shown, but a single set of blades 64 may also be used.

The blades 64 are mounted to a male blade power feed 66 that engages a female blade power feed 68 when the receiving module 32 is engaged in the processing module 44. The female blade power feed 68 is driven by a blade pulley 70 that is attached to a motor 74 (shown only in FIG. 6) through a main axle 72. The blades 64 may differ in size and shape. Alternately, each blade 64 may be attached to a different one of two concentric male blade power feeds 66. Each of the two male power feeds 66 engages a different one of two concentric female blade power feeds 68 when the receiving module 32 is engaged. Each of the two female power feeds 68 may be driven by a different one of two blade pulleys 70. The two blade pulleys 70 (shown in FIG. 8) may be attached to the same main axle 72. However, either the two female power feeds 68 or the two blade pulleys 70, or both, may have different diameters such that each blade 64 moves at different speeds. By the variations in blade size, shape or speed, each blades 64 may be optimized to act on a different size or types of organic matter.

The main axle 72 also drives a water pump 76 that is connected, when the receiving module 32 is engaged, through a water junction 78 and a water input line 80 to one or more water inlets 82 opening into the receiving module. Thus to wet and reduce organic matter in the receiving module, the motor 74 is turned on to spray water into the receiving module while driving the blades 64. Alternately, the water pump 76, water junction 78, water input line 80 and water inlets 82 may be omitted. In that case, the user may put water into the receiving module 32, for example by placing it under a tap in a sink, before engaging the receiving module 32 with the processing module 44. After processing, the receiving module 32 may be taken back to the sink for rinsing out or put into a dishwasher.

Reduced pieces of organic matter and water passes through the perforated liner 62, through water take out channels 84 and drain connections 86 to the processing module 44 (labeled in FIG. 6). Drain valves 88 in the processing module 44 are open while the motor 74 is turned on. A drain sensor 90 senses when pieces of organic matter are no longer passing into the processing module 44 and then signals the motor 74 to stop after a short period of time so that the receiving module 32 will be rinsed with water from the water jet. In some embodiments, the rinsing water is heated or injected with a disinfectant. Once the receiving module 32 is empty, the gate 52 opens and the user may remove the receiving module 32.

The water and pieces of organic matter pass into a forming chamber 92 in the processing module 44. As this happens, binder, or a mix of binder and other additives, is injected through a binder inlet 94. The binder is drawn from a binder reservoir 108 (shown in FIG. 6) which the user may refill or replace from the front of the processing module 44. The binder is mixed with the pieces of organic matter by the force of its injection and the turbulence of the water entering the forming chamber 92. Alternately, the binder inlet 94 and reservoir 108 (shown in FIG. 6) may be omitted and the user may deposit binder into the receiving module 32 before connecting it to the processing module 44. Further, the binder inlet 94 may be adapted to mate with an inlet of the receiving module 32 such that binder is injected in the receiving module 32 on or directly after engaging the modules 32, 44 together. By these alternatives, the binder or other additives are mixed with the organic waste as it is reduced in size.

The mix of pieces of organic matter, binder and water lands onto a screen floor 96 in the forming chamber 92. Free liquid water flows through the screen floor 96 and past a drying rod assembly 98 and leaves the forming chamber 92 through a forming chamber drain 100. A slurry of pieces of organic matter, binder and surface held water remain on top of the screen floor 96 and flow by gravity into a shape defined by the screen floor 96, walls of the forming chamber 92 and drying rod assembly 98.

A weight sensor 116 communicates with the screen floor 96 and senses the weight of the pieces of organic matter (and water attached to them) resting on the screen floor. The system controller 50 (shown in FIG. 6) compares the sensed weight to specifications relating to the output through an algorithm that determines whether enough organic matter is present. The algorithm may simply compare the weight of the organic matter to a minimum weight for the selected outcome. Alternately, the system controller 50 may allow the user to indicate what sort of waste has been entered. The indication may be made, for example, by pushing one of a set of buttons indicating whether the bulk of any load of matter is one of raw vegetables, cereals, absorbent paper, cooked leftovers or other options each time a load of matter is transferred from the receiving module 32. The system controller tracks the additional weight sensed by weight sensor 116 after each load of organic matter is added to the processing module 44 and a parameter indicating which button was pushed when the organic matter was transferred from the receiving module. The algorithm includes parameters corresponding to an estimated moisture content assigned to the different types of waste, calculates the estimated moisture content of the total amount of organic matter present, and adjusts the threshold weight according to a formula accounting for the estimated moisture content and the selected outcome. The outcome or output specifications are either preset or programmed by the user. The system controller 50 prevents further process steps from occurring until enough organic matter is collected. If the system controller 50 determines that an appropriate amount of organic matter has been collected while more organic matter is still being reduced in the receiving module 32, the reducing operation is shut down until the output is made and removed from the processing module 44. While the outcome is being made, the system controller 50 may be programmed to release the receiving module 32 to the user. Alternately, the user may over-ride all of these functions or program the system controller so that further process steps occur right after the receiving module 32 is emptied. In this case, random sizes, shapes or numbers of outcomes will be produced.

When the process is to continue, heating elements 102, which may be electrically powered radiant, infrared or microwave heaters, heat the slurry directly and indirectly by heating the drying rod assembly 98. As the slurry dries into a solid, moisture is drawn off through a moisture scavenging port 104. When a moisture sensor 106 indicates that the solidified slurry has reached a desired moisture content, the heating elements 102 are turned off. Prior to heating, the slurry may optionally be pressed. To press the slurry, the top of the forming chamber 92 may be fitted with a plate, not shown, movable to push the slurry against the screen floor 96 for a time and then retract. The extension of the plate may be stopped when a set distance is reached if the solid will always be of generally the same size or when a certain pressure is reached. The pressing plate may be moved automatically and be, for example, electrically powered. The pressing plate may also be moved manually, for example by providing a leaver on the side of the processing module 44 mechanically linked to the pressing plate.

Moisture collected through moisture scavenging port 104 during drying may be released to atmosphere either directly or through filters to remove odors. Referring to FIG. 6, the collected moisture may by converted into liquid water by connecting the moisture scavenging port 104 shown in FIG. 8) to a moisture input 130 to a moisture liquefying device 132 such as a condenser, dehumidifier or other device. The moisture liquefying device 132 may also include or be connected in series, with an odor reducing device 140, such as a gas porous membrane module or activated charcoal canister, to reduce odors before air or other gases are discharged through an exhaust 142. Liquid water produced from the vapor may be sent through a recycled vapor drain 134 to a household drain and leave the processing module 44. Alternately, the liquid water may flow through the recycled vapor drain 134 to a receptacle 136 for collected water within or connected to the processing module 44. Similarly, forming chamber drain 100 may be connected to a household drainpipe such that free liquid water leaves the processing module 44 or to a forming chamber water input 138 to receptacle 136. The user may empty the water in the receptacle 136 from time to time or the receptacle 136 may be fitted with an overflow 144 to a household drain. The receptacle 136 may be closed, fitted with filters on any outlet, treated with ozone or UV radiation, chilled or otherwise treated or configured to minimize the creation or escape of odors. The receptacle may be connected to the water pump 76 through a water supply line 146 and sized to be able to provide the source of water to wet the organic matter in the receiving module 32. In this way, no water, other than an initial fill of the receptacle 136, is required to process the waste. Moisture may also be collected, for reuse or to remove it from the processing module 44, by allowing it to condense on surfaces of processing module 44 from where it drips or runs down surfaces to the forming chamber drain 100.

In the embodiment illustrated in FIG. 6, because the solid is drier than the raw organic waste, and both liquid and gaseous forms of water are at least partially recaptured, the processing module 44 may produce an excess of water such that the receptacle 136 only needs to be filled on initial start up of the apparatus 30. However, the water in the receptacle 136 contains organic matter. The concentration of the organic matter is reduced by the recycled water from the moisture liquefying device 132 and so does not tend to become excessive for use in processing organic waste. However, the water in receptacle 136 does not provide an entirely clean source of water for rinsing the receiving module 32. For rinsing, switch 148 may be operated to connect water pump 76 (shown in FIG. 8) with a household water inlet 150 or to another reservoir dedicated to holding rinse water. Alternately, a water treatment device such as a clarifier or filter may be added to the receptacle or in line with water supply line 146 to treat the water in receptacle 136 to make it suitable for rinsing. Further alternately, clean water reclaimed from vapor produced while drying may be provided first to a reservoir for rinsing water and, if and when that reservoir is filled, to drain or to receptacle 136 for process water. In that way, clean rinsing water may still be obtained without requiring a hook-up to a household water supply. The receptacle 136 may also be configured or used to decant the water entering it, with only an upper portion lean in solids re-used as water and a lower portion rich in solids either sent to drain or returned to the forming chamber 92, (shown in FIG. 8), by flowing it onto a solid that is drying in the forming chamber 92. Whichever line supplies water for rinsing may also be fitted with a heater or chemical injector if a heater or disinfecting rinse is desired.

Referring again to FIG. 8, after the solid is dry and heating elements 102 are turned of, plungers 118 lift the solid upwards and move it sideways or rotate it so that it drops to a receiving platform 110. Alternately, heating elements 102 may be configured to not protrude into the solid or to be retractable and plungers 118 configured to slide the solid sideways off of the screen floor 96 through a hinged side panel in forming chamber 92. Further alternately, forming chamber 92 may be configured so that the user may slide it out on a track to remove the solid. The system controller 50 indicates that the solid is complete and the user may open a service door 112 or pull out the forming chamber 92. Forming chamber 92 may also be made to slide out of the processing module 44 automatically when the solid is complete. The user may then take the solid away or store it in a pull out drawer 114 (shown in FIG. 6) at the base of the apparatus 30. If desired, output may be produced that is sufficiently dry to be stored for two or three weeks or a month before it is thrown out, recycled, composted or used for another purpose.

Referring again to FIG. 6, the apparatus 30 may also be adapted for other configurations. For example, rather than standing in a fixed position, apparatus 30 may be made partially mobile through the use of 360 degree free-roaming casters 156 or other mobility devices such as wheels. Apparatus 30 may also be converted into a countertop unit by removing or relocating parts of the apparatus 30 below countertop base 152 shown in FIG. 6. To make a countertop apparatus 30 more compact and less tall, the receiving platform 110 is replaced by a smaller volume pull out tray 154 that also, in use, provides limited storage of produced outcomes. In both free-roaming and countertop versions of apparatus 30, the use of elements described above to recycle water may be sued to avoid the need for any hook-ups to household water supplies or drains although the user is then required to fill and enter one or more reservoirs. Alternately, releasable water inlet and drain connections may be used. For example, an inlet line may have a spring-loaded connection to a fitting on a sink aerator and a drain line may be run from the apparatus 30 to discharge into a sink. A combined connection, for example a sink mounted inlet and drain connection as used for portable dishwashers, may also be used. Depending on relative elevations, a free-roaming apparatus 30 may require a pump to discharge water to drain.

For a countertop apparatus 30, reducing size is generally desirable and so many features of the apparatus 30 described above may be removed. For example, water recycling features may be deleted to make the apparatus 30 smaller even though water and drain hook-ups may be required. The system controller 50 and the processes it controls may be made simpler or less automated which may reduce the size of the system controller 50 and also remove the need for some related elements, such as sensors. A less automated apparatus 30 may, for example, require the user to input binder into the receiving module 32 to avoid the need for binder reservoir 108 and binder transfer elements. Requiring the user to add water to the receiving module 32 and rinse or wash the receiving module 32 manually or in a dish washer may remove the need for a water pump 76 and various fluid conduits, valves and connections. The apparent size of a countertop apparatus 30 may also be reduced by re-locating some of the large components. For example, motor 74 may be inverted and relocated to where reservoir 136 is shown in FIG. 6 to reduce the height of the apparatus 30. Using a pull-out forming chamber 92 as the means to remove the outcome, as discussed above, also helps reduce the height of the apparatus as no separate pull out tray 154 or mechanism to move the outcome to the pull out tray 154 are then required. As for an under sink apparatus 30, components above line 48 in FIG. 6 may be deleted or re-located. In particular, for a countertop apparatus 30, requiring the receiving module 32 to be placed through a gate 52 requires the user to lift the receiving module 32 to an awkward height. Instead, components above line 48 may be removed at least as required to allow the receiving module 32 to be placed directly onto the mating components directly below line 48. A latch or other mechanism may then be added to releasably secure the receiving module 32 in place and, as discussed above, the latch or other mechanism may interact with or power other sensors or functions. Alternately, the gate 52 and its related components may be retained by the track 54 reduced in height, for example to about one half of the height of the receiving module 32 such that in position C of FIG. 7, the receiving module 32 protrudes from the processing module 44. In an embodiment, an inverted motor 74 is located behind where the receiving module 32 sits on the processing module 44, a pull out forming chamber 92 is used, there are no components above line 48 where the receiving module 32 sits on the processing module 44 and a latch is used to engage the receiving module 32 to the processing module 44. In this embodiment, the bottom of the apparatus 30 is near the bottom of the forming tray 92 and the receiving module 32 only needs to be lifted several cm from the countertop to engage it with the processing module 44.

A horizontally sliding door or track may also be used in place of gate 52 for either a countertop or free-standing apparatus 30. For example, the apparatus 30 may have a drawer or track that pulls out from the apparatus and accepts the receiving module 32 from the front, for a countertop apparatus 30, or from above, for a free-standing or roaming apparatus 30. The receiving module 32 becomes connected to the processing module 44 when the drawer or track is slid back into the processing module 44. For a countertop apparatus 30, this allows the apparatus 30 to be located further back on a counter to interfere less with working space on the counter. For a freestanding or roaming apparatus 30, this frees up the space formerly occupied by the gate 52 to function as a work surface.

Methods for Making Use of the Outcomes

Figure 9:
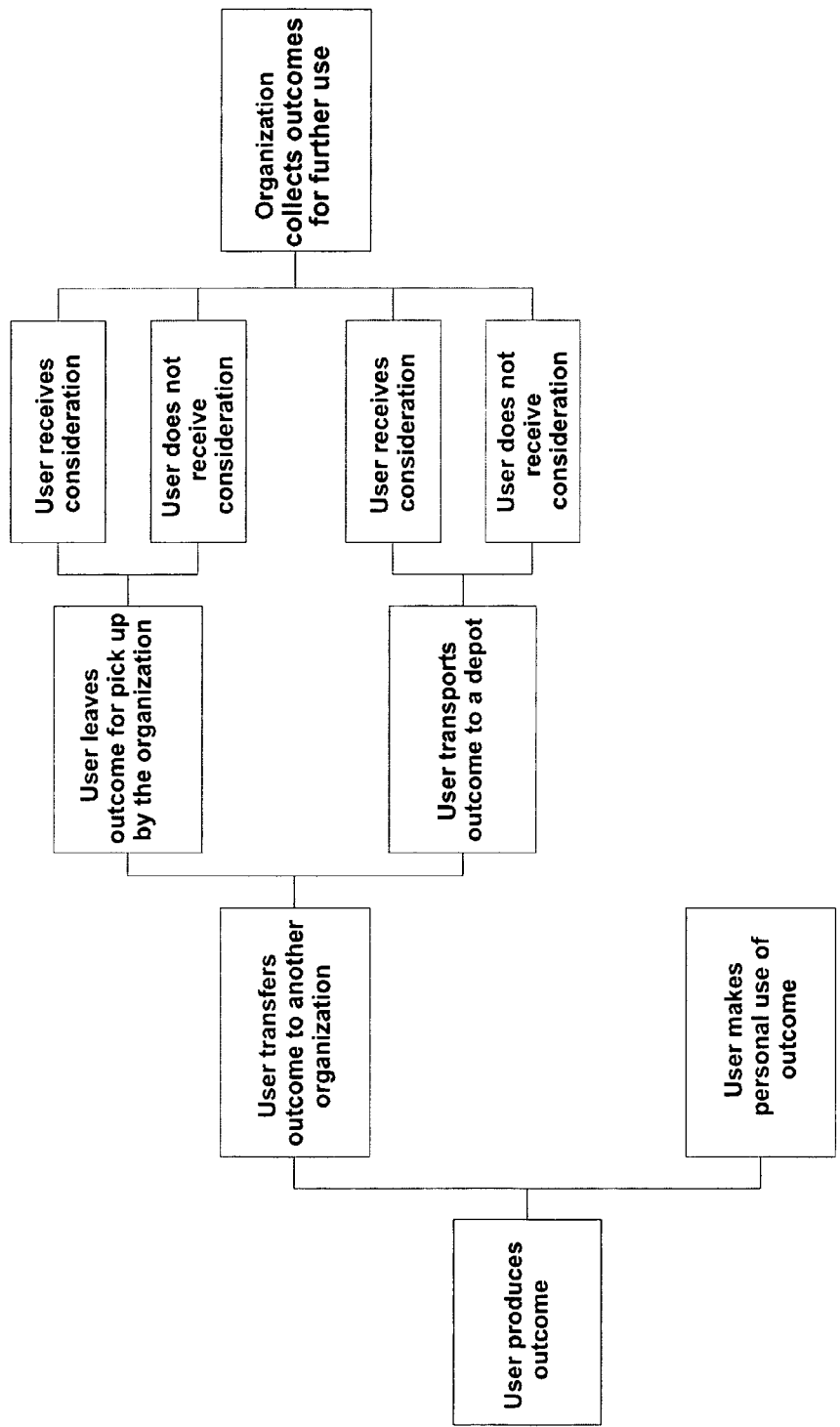
FIG. 9 is a chart of options for using outcomes.

FIG. 9 shows a basic option tree for making use of the outcomes. First, a household, business or other user of organic matter creates an outcome or, more typically, a collection of outcomes. The user may then choose between using the outcome personally and transferring the outcome to an organization.

For personal use, the user keeps the outcome and uses it as desired. For example, the user may compost the outcome by simply placing it on an ordinary compost pile and allowing it to break down and decompose. The binders in solid outcomes will break down on a compost pile and leave a collection of pieces of organic matter. The configuration of the solid may be chosen to help the solid break down faster. For example, an outcome in the shape of a thin sheet or disk with holes through it breaks down rapidly when exposed to the weather. Alternately, an outcome in the form of pieces may be selected for even faster decomposition. In either case, the organic matter decomposes quickly because it is already reduced to pieces and the user may choose to place the outcome directly where the compost is desired, such as in a garden, without first allowing the outcome to decompose in a compost pile. However, since the outcomes are durable and substantially odor-free if kept dry, outcomes may be collected over a period of days and transported to a composting area when convenient. The outcomes may also be used for other purposes such as a fuel, animal feed, mulch or as a temporary insulator.

Users that do not wish to use the outcome themselves may transfer the outcome to an organization such as a municipality or environmental company. For example, the outcome can be left for pick up in the same way as ordinary garbage is left for pickup. In this case, the user receives no direct consideration or incentive from the organization, but merely enjoys the reduced odors and density, dryness and other advantages of the outcome. Alternately, the user may leave the outcomes for separate pick up by an organization that will put the outcomes to use, such as a municipality running a composting program. In this case, the user still receives no material consideration although there are indirect benefits to the user such as a cleaner environment and reduced use of landfills. But since the qualities of the outcomes make them more agreeable to collect, store and transport than raw organic waste, users will not have compelling reasons not to participate in municipal composting programs. In particular, even business users or users in apartments or condominiums will be able to participate in composting programs without significant inconvenience.

Alternately, the organization may encourage the user to produce and leave the outcome for pick up by providing consideration to the user. The consideration may be provided directly. For example, the organization may pay the user, in money, credits or by other means, for each quantity of outcome left for pick up either each time a pick up is made, or periodically after recording the amount left for pick up over a period of time. Alternately, the consideration may be provided through a less direct incentive such as a program that reduces the user's overall cost of garbage pickup or allows the user a larger volume of garbage pick up. For example, the organization may only pick up ordinary garbage in bags that have a tag that the user must purchase from the organization for a fee. Containers of outcome, however, are picked up free of charge. Optionally, further incentive can be provided by the organization giving the user a tag for each specified quantity of outcome that the user leaves for pick up. For another example, the organization may charge an annual fee for garbage pickup. The amount of the fee is related to the maximum number of bags of mixed garbage that the organization will be obliged to pick up per collection period. However, output separated from other garbage and left for pick up in an identifiable container, such as a clear bag or open bin, will be picked up for free and not counted towards the permitted maximum number of bags of mixed garbage. In yet another example, the organization increases the time between collections, for example to two weeks or more, either unilaterally or with the user's agreement. The organization spends less money on collection and passes at least a portion of that savings on to the user. The user also has to take out the garbage less often. But since raw organic waste would become extremely unpleasant over long periods of time between pick ups, the user will want to convert as much organic waste to outcomes as possible.

As a further alternative, the user may transport the outcomes to a depot. Accordingly, users that do not have a garbage pick up service, for example rural residents, may transport the outcomes to a transfer station or other depot. At the depot, the outcomes may simply be accepted as regular garbage without consideration. The user receives no benefit but that the outcome is easier to transport than raw organic waste and does not leave offensive odors even in a passenger car. Alternately, the user may receive some consideration analogous to the consideration discussed above, for example, a waiver of the depot's ordinary fee for disposing outcomes separated from regular garbage or a reduced fee for disposing regular garbage for every specified quantity of outcome left at the depot.

Since the outcomes may be transported without offense, depots may also be set up to collect outcomes independent of or as a supplement to the existing garbage or non-organic recycling programs in effect in an area. In particular, while only a limited number of users are able to produce outcomes, the organizations operating existing garbage and non-organic recycling programs may not wish to provide a separate pick up for outcomes. Instead, depots are provided to accept outcomes from those users capable of producing outcomes. To the extent that the existing garbage and non-organic recycling programs reward users, or are made to reward users, for reducing the volume of garbage to be picked up or the frequency of pick up, users will benefit from converting organic waste to outcomes and taking it to the depot. Accordingly, a program of encouraging businesses or households to divert organic waste to outcomes can be initiated by providing depots to accept the outcomes and simultaneously providing pick up for other garbage or recyclables according to a program that benefits those that bring outcomes to the depots. For example, pick up for other garbage can be made less frequent, the number of bags of ordinary garbage that will be picked up can be limited, or the user may be charged, at least in part, per bag of ordinary garbage picked up.

Benefit can also be provided based on the amount of outcome brought by a user to a depot. This benefit can be used as an additional or alternate way to encouraging businesses or households to divert organic waste to outcomes without providing door to door pick up of outcomes. This benefit can also be used as a way for a company which wants to make further use of the outcomes but has no connection with the organization that collects other garbage to secure outcomes.

The depot may provide a benefit to the users in many ways. For example, the depot may simply pay the user, for example in money, credit slips, garbage collection tags or by other means, for every specified quantity of outcomes brought to the depot. The quantity of outcomes may be specified by various means such as weight, volume, number of standard bags or number of solid outcomes of a standard size. The depot may make the payment immediately or record the payment to an account. The user may withdraw from the account from time to time or the amount in the account may be linked to other accounts of the user, for example the user's municipal tax bill may be reduced by the amount in the account.

The depot may be manually operated, automatic or have a mix of automatic and manual functions. For example, the depot may have an attendant that records, either on paper or in a database, the amount of outcomes brought to the depot and the personal or account information of the user. Optionally, personal or account information may be embedded on a magnetic strip card that is swiped through a reader or linked to an account number that the user punches in at the depot to avoid the need to manually record the information. The outcomes themselves may also be labeled, for example with a bar code label applied manually by the user or automatically by the outcome producing apparatus, so that personal or account information is recorded as each unit of outcomes is placed in the depot.

Through a combination of such methods, the depot may be fully automated. For example, the depot may have a container with a scale platform at the bottom and an opening at the top. The user swipes a magnetic card that transfers the user's account information to the depot and causes the depot to disengage a magnetic lock on the opening. The user then inserts the outcomes through the opening. When all outcomes are inserted, the user pushes a button that causes the depot to take and record the weight of the outcomes. The depot then either dispenses consideration on the spot, or records the weight of outcome to the user's account. At about the same time, the depot slides the outcomes off of the scale platform into a storage area and re-engages the magnetic lock. Periodically, the organization running the depot picks up the stored outcomes for further use.

Another fully automated depot as adapted may be used to work with a standardized size and shape of solid outcome. The depot has a slot that the outcomes can be slid into. The slot contains a bar code reader that scans the outcomes as they slide by. The bar codes give the depot the user's account information so that the number of solids inserted can be recorded to the user's account. If the solids are not bar coded, the depot simply counts the number of solids slid into the depot and for every one or other specified number of solids, issues a receipt or token redeemable elsewhere, a coin, garbage tag or other form of consideration.

Through any of these or other methods, an organization collects large numbers of outcomes for further use. The output may be used, for example, as input to a large scale composting operation, as animal feed or fuel, or it may be simply bagged for re-sale to individuals or other organizations.

It will be apparent to those skilled in the art that the invention may also be practiced in embodiments different from those described above. In particular, but without limitation, the invention has been described primarily for use in managing household organic waste, but may be adapted for use in other applications, such as commercial food processing or restaurant waste. Many other additions, deletions or modifications may be made to the embodiments described above without departing from the spirit and scope of the invention.

I claim:

1. A process for producing a biodegradable solid of organic waste comprising:
   providing a receiving module removably mounted to a processing module, with the receiving module having a perforated liner;
   collecting organic waste by placing the organic waste in the perforated liner of the receiving module when the receiving module is removed from the processing module;
   reducing the organic waste to pieces before the organic waste is dried by operating a reducing element located in the perforated liner of the receiving module while the receiving module is mounted to the processing module;
   transferring the pieces from the receiving module to the processing module while the receiving module is mounted to the processing module by passing the pieces through the perforated liner;
   mixing the pieces with a biodegradable binder to form a mixture; and
   forming a unitary biodegradable solid from the mixture by drying the mixture wherein the reduced organic waste pieces are converted to a unitary biodegradable solid.

2. The process of claim 1 wherein the transferring further comprises the pieces traveling from the perforated liner of the receiving module through at least one passageway to the processing module.

3. The process of claim 2 wherein the transferring further comprises the pieces traveling to a form in the processing module.

4. The process of claim 1 wherein the transferring the pieces further comprises flushing the pieces through the perforated liner.

5. The process of claim 1 wherein forming the mixture comprises mixing the pieces with water.

6. The process of claim 1 wherein forming the unitary biodegradable solid comprises forming the mixture into a predetermined shape.

7. The process of claim 1 wherein the drying further comprises heating the mixture.

8. The process of claim 7 further comprising removing liquid water from the mixture.

9. The process of claim 8 wherein the liquid water is re-used in a subsequent process for producing a unitary biodegradable solid.

10. The process of claim 7 further comprising capturing water vapor emitted while drying the mixture.

11. The process of claim 10 further comprising converting the captured water vapor to liquid water.

12. The process of claim 11 wherein the liquid water is re-used in a subsequent process for producing a unitary biodegradable solid.

13. The process of claim 8 wherein the water or biodegradable binder in the mixture is obtained from the organic waste.

14. The process of claim 13 wherein the biodegradable binder is a carbohydrate.

15. The process of claim 14 wherein the biodegradable binder is activated by heating.

16. The process of claim 1 wherein the biodegradable binder is a carbohydrate.

17. The process of claim 16 wherein the biodegradable binder is activated by the heating.

18. The process of claim 1 wherein the drying comprises drying the mixture to a moisture content at which the mixture is free of odors caused by microbial activity.

* * * * *

UNITED STATES PATENT AND TRADEMARK OFFICE
CERTIFICATE OF CORRECTION

PATENT NO.        : 7,621,472 B2
APPLICATION NO.   : 10/661567
DATED             : November 24, 2009
INVENTOR(S)       : Alexander Manu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1337 days.

Signed and Sealed this

Twenty-sixth Day of October, 2010

David J. Kappos
*Director of the United States Patent and Trademark Office*